US012637579B2

(12) United States Patent
Ikoshi et al.

(10) Patent No.: US 12,637,579 B2
(45) Date of Patent: May 26, 2026

(54) INK-JET INK, INK SET, AND IMAGE-RECORDING METHOD

(71) Applicant: FUJIFILM Corporation, Tokyo (JP)

(72) Inventors: Masao Ikoshi, Kanagawa (JP); Taiga Mizoe, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 38 days.

(21) Appl. No.: 18/505,741

(22) Filed: Nov. 9, 2023

(65) Prior Publication Data

US 2024/0067837 A1     Feb. 29, 2024

Related U.S. Application Data

(63) Continuation of application No. PCT/JP2022/018651, filed on Apr. 25, 2022.

(30) Foreign Application Priority Data

May 14, 2021     (JP) ................................. 2021-082581

(51) Int. Cl.
*C09D 11/322*          (2014.01)
*B41J 2/21*            (2006.01)
          (Continued)
(52) U.S. Cl.
CPC ........... *C09D 11/322* (2013.01); *B41J 2/2114* (2013.01); *B41J 2/2117* (2013.01); *C09D 11/107* (2013.01);
          (Continued)
(58) Field of Classification Search
CPC ..... C09D 11/322; C09D 11/107; C09D 11/38; C09D 11/40; C09D 11/54; B41J 2/2114; B41J 2/2117; B41M 5/0017
See application file for complete search history.

(56) References Cited

U.S. PATENT DOCUMENTS

2008/0257188 A1* 10/2008 Yokoi ................. B41M 7/0081
                                                      524/110
2011/0069117 A1      3/2011 Ohzeki et al.
                     (Continued)

FOREIGN PATENT DOCUMENTS

CN          103289470 A      9/2013
CN          104583346 A      4/2015
                     (Continued)

OTHER PUBLICATIONS

Extended European Search Report dated Sep. 20, 2024, issued in European Application No. 22807328.4.
(Continued)

*Primary Examiner* — Yaovi M Ameh
(74) *Attorney, Agent, or Firm* — Sughrue Mion, PLLC

(57)          ABSTRACT

Provided are an ink jet ink, an ink set, and an image recording method, in which an image with an excellent covering property can be recorded and abrasion deterioration of an ink jet head can be suppressed. The ink jet ink is an ink jet ink including water, titanium dioxide particles, and a silicon compound, in which an average primary particle diameter of the titanium dioxide particles is 100 nm or greater, the silicon compound is at least one selected from the group consisting of a silicate and colloidal silica, a content of the silicon compound is 0.0020% by mass or greater with respect to a total amount of the titanium dioxide particles, and a ratio of a volume average particle diameter of the colloidal silica to the average primary particle diameter of the titanium dioxide particles is 0.04 or less.

5 Claims, 1 Drawing Sheet

(51) Int. Cl.

| | |
|---|---|
| *C09D 11/107* | (2014.01) |
| *C09D 11/38* | (2014.01) |
| *C09D 11/40* | (2014.01) |
| *C09D 11/54* | (2014.01) |
| *B41M 5/00* | (2006.01) |

(52) U.S. Cl.

CPC .............. *C09D 11/38* (2013.01); *C09D 11/40* (2013.01); *C09D 11/54* (2013.01); *B41M 5/0017* (2013.01)

(56) References Cited

U.S. PATENT DOCUMENTS

| | | | |
|---|---|---|---|
| 2013/0224451 A1 | 8/2013 | Shiono et al. | |
| 2018/0010006 A1 | 1/2018 | Kasperchik et al. | |
| 2018/0223119 A1 | 8/2018 | Oriakhi et al. | |
| 2019/0194482 A1 | 6/2019 | Yamazaki et al. | |
| 2020/0087527 A1 | 3/2020 | Okuda | |
| 2020/0332137 A1 | 10/2020 | Kawata et al. | |
| 2021/0002502 A1 | 1/2021 | Kawai et al. | |
| 2021/0009834 A1 | 1/2021 | Kawai et al. | |
| 2022/0002570 A1 | 1/2022 | Kawai et al. | |
| 2022/0227154 A1 | 7/2022 | Sato et al. | |
| 2024/0343052 A1 | 10/2024 | Kariya et al. | |

FOREIGN PATENT DOCUMENTS

| | | | | | |
|---|---|---|---|---|---|
| CN | 105482552 A | | 4/2016 | | |
| CN | 111566171 A | | 8/2020 | | |
| CN | 111918937 A | | 11/2020 | | |
| CN | 111936585 A | | 11/2020 | | |
| JP | 2001-96902 A | | 4/2001 | | |
| JP | 2008-081660 A | | 4/2008 | | |
| JP | 2017031354 A | * | 2/2017 | ............. | C09D 11/00 |
| JP | 2018-009260 A | | 1/2018 | | |
| JP | 2018-528876 A | | 10/2018 | | |
| JP | 2019-112600 A | | 7/2019 | | |
| JP | 2019-112601 A | | 7/2019 | | |
| JP | 2019-116598 A | | 7/2019 | | |
| JP | 2020-044724 A | | 3/2020 | | |
| WO | 2017/009601 A1 | | 1/2017 | | |
| WO | 2019/187665 A1 | | 10/2019 | | |
| WO | 2019/188856 A1 | | 10/2019 | | |
| WO | WO-2019188855 A1 | * | 10/2019 | .......... | B41J 11/0015 |
| WO | 2020/174940 A1 | | 9/2020 | | |
| WO | 2020/195211 A1 | | 10/2020 | | |
| WO | 2020/203088 A1 | | 10/2020 | | |
| WO | WO-2021084960 A1 | * | 5/2021 | .......... | B41M 5/0017 |
| WO | 2022/024106 A1 | | 2/2022 | | |
| WO | 2023/120320 A1 | | 6/2023 | | |

OTHER PUBLICATIONS

International Preliminary Report on Patentability (with translation of Written Opinion) dated Nov. 14, 2023 in International Application No. PCT/JP2022/018651.

International Search Report dated Jul. 5, 2022 in International Application No. PCT/JP2022/018651.

Written Opinion dated Jul. 5, 2022 in International Application No. PCT/JP2022/018651.

Communication dated Apr. 11, 2025 in Chinese Application No. 202280034377.1.

Office Action issued Sep. 9, 2025 in Chinese Patent Application No. 202280034377.1.

Communication dated Feb. 3, 2026, issued in Japanese Application No. 2023-520952.

Communication dated Mar. 31, 2026 in Chinese Application No. 202280034377.1.

* cited by examiner

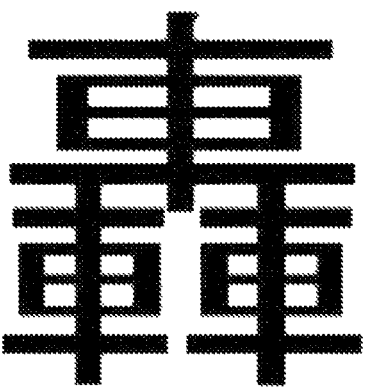

INK-JET INK, INK SET, AND IMAGE-RECORDING METHOD

CROSS-REFERENCE TO RELATED APPLICATIONS

This application is a continuation application of International Application No. PCT/JP2022/018651, filed Apr. 25, 2022, which is incorporated herein by reference. Further, this application claims priority from Japanese Patent Application No. 2021-082581, filed May 14, 2021, which is incorporated herein by reference.

BACKGROUND OF THE INVENTION

1. Field of the Invention

The present disclosure relates to an ink jet ink, an ink set, and an image recording method.

2. Description of the Related Art

In recent years, examination has been conducted on image recording using an ink jet ink that contains a white pigment. For example, JP2019-112600A discloses, as a white pigment composition capable of improving sedimentation stability and whiteness in a well-balanced manner, a white pigment composition containing core particles, core-shell type titanium dioxide particles which have a shell layer coating the surface of the core particles and consisting of titanium dioxide and have an average particle diameter of 50 nm or greater and 5000 nm or less, silicon oxide particles having an average particle diameter of 3 nm or greater and 100 nm or less, and a resin. JP2019-112600A also discloses that the white pigment composition is used as an ink in an ink jet recording method.

Further, JP2020-044724A discloses, as a recording method in which fissuring is unlikely to occur while the image quality is satisfactorily maintained, a recording method including a white ink adhesion step of jetting a white ink from a recording head to make the white ink adhere to a recording medium, a non-white ink adhesion step of jetting a non-white ink containing a non-white coloring material from a recording head to make the non-white ink adhere to a recording medium; and a pretreatment liquid adhesion step of making a pretreatment liquid containing an aggregating agent adhere to a recording medium, in which the white ink contains a white pigment and inorganic fine particles having a volume average particle diameter less than that of the white pigment.

SUMMARY OF THE INVENTION

An image with an excellent covering property can be recorded by image recording using an ink jet ink that contains titanium dioxide particles as a white pigment. Here, the covering property denotes a property of covering a base (for example, a base material or an image recorded on a base material).

However, as a result of examination conducted by the present inventors, it was found that in image recording using an ink jet ink containing titanium dioxide particles as a white pigment, abrasion deterioration of an ink jet head for jetting the ink jet ink is likely to occur. Here, the abrasion deterioration of the ink jet head denotes deterioration occurring in a case where a portion of the ink jet head in contact with the ink jet ink is polished by titanium dioxide particles.

Further, as a result of examination conducted by the present inventors, it was found that in a case where an image is recorded under a condition that the abrasion deterioration of the ink jet head is intended to be suppressed, the covering property of the image may be degraded.

An object of an aspect of the present disclosure is to provide an ink jet ink, an ink set, and an image recording method, in which an image with an excellent covering property can be recorded and the abrasion deterioration of an ink jet head can be suppressed.

Specific means for achieving the above-described objects includes the following aspects.

<1> An ink jet ink comprising: water; titanium dioxide particles; and a silicon compound, in which an average primary particle diameter of the titanium dioxide particles is 100 nm or greater, the silicon compound is at least one selected from the group consisting of a silicate and colloidal silica, a content of the silicon compound is 0.0020% by mass or greater with respect to a total amount of the titanium dioxide particles, and a ratio of a volume average particle diameter of the colloidal silica to the average primary particle diameter of the titanium dioxide particles is 0.04 or less.

<2> The ink jet ink according to <1>, in which the silicon compound contains a silicate, and the silicate is at least one selected from the group consisting of an alkali metal silicate and an ammonium silicate.

<3> The ink jet ink according to <1> or <2>, further comprising: a polymer dispersant, in which the polymer dispersant contains a block polymer or a polymer having a crosslinked structure.

<4> The ink jet ink according to any one of <1> to <3>, in which the content of the silicon compound is in a range of 0.040% by mass to 2.0% by mass with respect to the total amount of the titanium dioxide particles.

<5> An ink set comprising: a white ink which is the ink jet ink according to any one of <1> to <4>; and a colored ink which contains water and a color pigment.

<6> The ink set according to <5>, in which in a case where the silicon compound contained in the white ink is defined as a first silicon compound, the colored ink further contains a second silicon compound which is at least one selected from the group consisting of a silicate and colloidal silica, and in a case where a content of the first silicon compound with respect to a total amount of the white ink is defined as X1% by mass and a content of the second silicon compound with respect to a total amount of the colored ink is defined as X2% by mass, a ratio of X1/X2 is less than 1.0.

<7> The ink set according to <5> or <6>, in which in a case where the silicon compound contained in the white ink is defined as a first silicon compound, the colored ink further contains a second silicon compound which is at least one selected from the group consisting of a silicate and colloidal silica, the first silicon compound contains a silicate, and the second silicon compound contains colloidal silica.

<8> The ink set according to any one of <5> to <7>, further comprising: a pretreatment liquid which contains water and an aggregating agent.

<9> An ink set comprising: the ink jet ink according to any one of <1> to <4>; and a pretreatment liquid which contains water and an aggregating agent.

<10> An image recording method comprising: an ink applying step of applying the ink jet ink according to any one of <1> to <4> onto an impermeable base material by an ink jet method.

<11> The image recording method according to <10>, further comprising: a pretreatment liquid applying step of applying a pretreatment liquid which contains water and an aggregating agent onto the impermeable base material before the ink applying step, in which the ink applying step is performed such that the ink jet ink is applied onto a region where the pretreatment liquid has been applied on the impermeable base material where the pretreatment liquid has been applied.

<12> An image recording method comprising: a colored ink applying step of jetting the colored ink from an ink jet head and applying the colored ink onto an impermeable base material, using the ink set according to any one of <5> to <9>; and a white ink applying step of jetting the white ink from the ink jet head and applying the white ink onto a region where the colored ink has been applied on the impermeable base material where the colored ink has been applied, using the ink set.

<13> The image recording method according to <12>, further comprising: a pretreatment liquid applying step of applying a pretreatment liquid which contains water and an aggregating agent onto the impermeable base material before the colored ink applying step, in which the colored ink applying step is performed such that the colored ink is applied onto a region where the pretreatment liquid has been applied on the impermeable base material where the pretreatment liquid has been applied.

According to an aspect of the present disclosure, it is possible to provide an ink jet ink, an ink set, and an image recording method, in which an image with an excellent covering property can be recorded and abrasion deterioration of an ink jet head can be suppressed.

BRIEF DESCRIPTION OF THE DRAWINGS

FIG. 1 is a character image used for evaluation in examples.

DESCRIPTION OF THE PREFERRED EMBODIMENTS

In the present disclosure, a numerical range shown using "to" indicates a range including the numerical values described before and after "to" as a lower limit and an upper limit.

In the present disclosure, in a case where a plurality of substances corresponding to respective components in a composition are present, the amount of the respective components in the composition indicates the total amount of the plurality of substances present in the composition unless otherwise specified.

In a numerical range described in a stepwise manner in the present disclosure, an upper limit or a lower limit described in a certain numerical range may be replaced with an upper limit or a lower limit in another numerical range described in a stepwise manner or a value described in an example.

In the present disclosure, the meaning of the term "step" includes not only an independent step but also a step whose intended purpose is achieved even in a case where the step is not clearly distinguished from other steps.

In the present disclosure, a combination of preferred embodiments is a more preferred embodiment.

In the present disclosure, "image" denotes an entire film formed by applying an ink, and "image recording" denotes formation of the film.

Further, the concept of "image" in the present disclosure also includes a solid image.

[Ink Jet Ink]

An ink jet ink of the present disclosure (hereinafter, also simply referred to as "ink") contains water, titanium dioxide particles, and a silicon compound, in which the average primary particle diameter of the titanium dioxide particles is 100 nm or greater, the silicon compound is at least one selected from the group consisting of a silicate and colloidal silica, the content of the silicon compound is 0.0020% by mass or greater with respect to the total amount of the titanium dioxide particles, and the ratio of the volume average particle diameter of the colloidal silica to the average primary particle diameter of the titanium dioxide particles is 0.04 or less.

That is, the ink jet ink of the present disclosure is an ink jet ink containing water, titanium dioxide particles, and a silicon compound, in which the average primary particle diameter of the titanium dioxide particles is 100 nm or greater, the silicon compound is at least one selected from the group consisting of a silicate and colloidal silica, the content of the silicon compound is 0.0020% by mass or greater with respect to a total amount of the titanium dioxide particles, and in a case where the silicon compound contains colloidal silica, the ratio of the volume average particle diameter of the colloidal silica to the average primary particle diameter of the titanium dioxide particles is 0.04 or less.

According to the ink of the present disclosure, an image with an excellent covering property can be recorded, and the abrasion deterioration of the ink jet head in a case of recording an image can be suppressed.

The reason why such an effect is exhibited is assumed as follows.

The titanium dioxide particles are particles having a high refractive index and an average primary particle diameter of 100 nm or greater, and this characteristic of the particles is considered to contribute to the effect of the covering property of the image (that is, the property of covering the base).

A specific silicon compound contained in the ink, specifically, a silicate and/or colloidal silica having a small particle diameter (specifically, colloidal silica having an average primary particle diameter of 0.04 or less with respect to the average primary particle diameter of the titanium dioxide particles; the same applies hereinafter) is considered to contribute to the effect of suppressing abrasion deterioration of the ink jet head.

Specifically, the abrasion deterioration of the ink jet head is considered to occur in a case where a portion where the ink comes into contact with the ink jet head is polished by the titanium dioxide particles which are hard particles contained in the ink.

In the ink of the present disclosure, it is considered that a specific silicon compound (specifically, a silicate and/or the colloidal silica having a small particle diameter described above) enters between the titanium dioxide particles and the contact portion in the ink jet head and acts as a cushion, and as a result, the abrasion deterioration of the ink jet head is suppressed.

It is considered that the characteristic of the titanium dioxide particles having an average primary particle diameter of 100 nm or greater also contributes to the effect of suppressing the abrasion deterioration of the ink jet head.

The reason for this is considered to be that in a case where the average primary particle diameter of the titanium dioxide particles is not extremely small, minute scratches caused by polishing which have a great influence on the abrasion deterioration are suppressed.

Hereinafter, each component that can be contained in the ink of the present disclosure will be described.

<Water>

The ink of the present disclosure contains water (A).

The content of water is preferably 30% by mass or greater, more preferably 40% by mass or greater, still more preferably 50% by mass or greater, and even still more preferably 60% by mass or greater with respect to the total amount of the ink.

The upper limit of the content of water is appropriately determined according to the content of other components. The upper limit of the content of water may be 90% by mass, 80% by mass, or the like.

<Titanium Dioxide Particles>

The ink of the present disclosure contains at least one kind of titanium dioxide particles.

Since the titanium dioxide particles are particles having a large refractive index, this characteristic contribute to improvement of the covering property of an image.

In the ink of the present disclosure, it is preferable that the titanium dioxide particles function as a white pigment.

It is preferable that the ink of the present disclosure is a white ink.

The average primary particle diameter of the titanium dioxide particles contained in the ink of the present disclosure is 100 nm or greater. In this manner, the covering property of the image is improved. Further, the effect of suppressing the abrasion deterioration of the ink jet head can also be obtained.

The average primary particle diameter of the titanium dioxide particles is preferably 150 nm or greater and more preferably 200 nm or greater.

Further, from the viewpoint of the jettability of the ink, the average primary particle diameter of the titanium dioxide particles is preferably 400 nm or less and more preferably 300 nm or less.

In the present disclosure, the average primary particle diameter of the titanium dioxide particles is a value measured using a transmission electron microscope (TEM). A transmission electron microscope 1200EX (manufactured by JEOL Ltd.) can be used for the measurement.

Specifically, the average particle diameter thereof is determined by adding an ink diluted to 1,000 times dropwise to Cu200 mesh (manufactured by JEOL Ltd.) to which a carbon film has been attached, drying the ink, measuring the equivalent circle diameters of 300 independent titanium dioxide particles which do not overlap each other in the image enlarged at a magnification of 100000 times using a TEM, and averaging the measured values.

The content of the titanium dioxide particles in the ink of the present disclosure is preferably in a range of 1% by mass to 20% by mass, more preferably in a range of 3% by mass to 20% by mass, still more preferably in a range of 5% by mass to 20% by mass, even still more preferably in a range of 6% by mass to 20% by mass, and even still more preferably in a range of 7% by mass to 15% by mass with respect to the total amount of the ink.

In a case where the content of the titanium dioxide particles in the ink is 1% by mass or greater with respect to the total amount of the ink, the covering property of the image is further improved.

In a case where the content of the titanium dioxide particles in the ink is 20% by mass or less with respect to the total amount of the ink, it is advantageous in terms of improving the jettability of the ink and suppressing the abrasion deterioration of the ink jet head.

<Silicon Compound>

The ink of the present disclosure contains at least one silicon compound (hereinafter, also referred to as "specific silicon compound") selected from the group consisting of a silicate and colloidal silica.

As described above, the specific silicon compound contributes to suppression of the abrasion deterioration of the ink jet head.

As the specific silicon compound, for example, known documents such as JP5430316B may be appropriately referred to.

In addition, the specific silicon compound also contributes to suppression of dissolution deterioration of the ink jet head.

Here, the dissolution deterioration of the ink jet head denotes deterioration occurring in a case where components in the portion where the ink comes into contact with the ink jet head are dissolved in the ink.

It is considered that silicon (Si) in the specific silicon compound contributes to the effect of suppressing the dissolution deterioration of the ink jet head. Specifically, the reason for this is considered to be that in a case where the dissolution deterioration of the ink jet head occurs (specifically, in a case where components in the portion where the ink comes into contact with the ink jet head are dissolved in the ink), a repair effect of repairing the site where dissolution deterioration has occurred with silicon (Si) in the specific silicon compound contained in the ink is exhibited. The repair effect is an effect that is particularly effectively exhibited in a case where at least a part of the portion where the ink comes into contact with the ink jet head contains silicon. However, it is considered that the above-described repair effect can be obtained even in a case where the part described above does not contain silicon.

Examples of the portion where the ink comes into contact with the ink jet head include a nozzle plate and an ink flow path in the ink jet head.

(Silicate)

A water-soluble silicate is preferable as the silicate that can constitute the specific silicon compound.

In the present disclosure, the term "water-soluble" denotes a property that the amount of a substance to be dissolved in 100 g of distilled water at 25° C. is 1 g or greater.

As "water-soluble", a property that the amount of a substance to be dissolved in distilled water at 25° C. is 2 g or greater is preferable, a property that the amount thereof is 5 g or greater is more preferable, and a property that the amount thereof is 10 g or greater is still more preferable.

The silicate may be a salt of metasilicic acid or a salt of orthosilicic acid.

As the silicate, a commercially available compound (for example, water glass) may be used, or a silicate obtained by preparation may be used.

Examples of the silicate include an alkali metal salt of silicic acid such as sodium silicate or potassium silicate; an alkaline earth metal salt of silicic acid such as calcium silicate or magnesium silicate; and an ammonium salt of silicic acid.

From the viewpoint of the effect of suppressing abrasion deterioration of the ink jet head, it is preferable that the silicate is at least one selected from the group consisting of an alkali metal silicate and an ammonium silicate.

From the viewpoint of the effect of suppressing abrasion deterioration of the ink jet head, it is preferable that the specific silicon compound contains a silicate and that the silicate is at least one selected from the group consisting of an alkali metal silicate and an ammonium silicate.

(Colloidal Silica)

The colloidal silica that can constitute the specific silicon compound is colloidal silica having a volume average particle diameter of 0.04 or less with respect to the average primary particle diameter of the titanium dioxide particles. In this manner, the above-described function as a cushion is exhibited, and the effect of suppressing abrasion deterioration of the ink jet head is exhibited.

Further, in a case where the volume average particle diameter of the colloidal silica is 0.04 or less with respect to the average primary particle diameter of the titanium dioxide particles, the surface area of the colloidal silica is increased to some extent (that is, the surface area of the colloidal silica is suppressed from being extremely small), and as a result, the effect of suppressing dissolution deterioration of the ink jet head is also exhibited.

The lower limit of the ratio of the volume average particle diameter of colloidal silica to the average primary particle diameter of the titanium dioxide particles (hereinafter, also referred to as "particle diameter ratio [colloidal silica/titanium dioxide particles]") is not particularly limited from the viewpoint of the effect of suppressing abrasion deterioration of the ink jet head.

The lower limit of the particle diameter ratio [colloidal silica/titanium dioxide particles] may be, for example, 0.001, 0.05, or 0.01. The upper limit of the particle diameter ratio [colloidal silica/titanium dioxide particles] is 0.04, but may be, for example, 0.03 or 0.02.

The colloidal silica is a colloid consisting of fine particles of an inorganic oxide that contains silicon.

The colloidal silica may contain silicon dioxide (including a hydrate thereof) as a main component and an aluminate as a minor component.

Examples of the aluminate that may be contained as a minor component include sodium aluminate and potassium aluminate.

Further, the colloidal silica may contain inorganic salts such as sodium hydroxide, potassium hydroxide, lithium hydroxide, and ammonium hydroxide, and organic salts such as tetramethylammonium hydroxide. These inorganic salts and organic salts function as, for example, a stabilizing agent for a colloid.

A dispersion medium in the colloidal silica is not particularly limited, and may be any of water, an organic solvent, or a mixture thereof.

The organic solvent may be a water-soluble organic solvent or a water-insoluble organic solvent, but a water-soluble organic solvent is preferable as the organic solvent.

Specific examples of the water-soluble organic solvent include methanol, ethanol, isopropyl alcohol, and n-propanol.

A method of producing colloidal silica is not particularly limited, and the colloidal silica can be produced by a method that has been commonly used. For example, colloidal silica can be produced from water glass or aerosil synthesis performed by thermal decomposition of silicon tetrachloride. Alternatively, colloidal silica can also be produced by a liquid phase synthesis method such as hydrolysis of an alkoxide (see, for example, "Fiber and Industry", Vol. 60, No. 7 (2004), p. 376) or the like.

The volume average particle diameter of the colloidal silica is not limited as long as the particle diameter ratio [colloidal silica/titanium dioxide particles] is 0.04 or less.

From the viewpoint of more effectively obtaining the effect of suppressing abrasion deterioration of the ink jet head, the volume average particle diameter of the colloidal silica is preferably 200 nm or less, more preferably 100 nm or less, still more preferably 50 nm or less, even still more preferably 25 nm or less, and even still more preferably 20 nm or less.

The lower limit of the volume average particle diameter of the colloidal silica may be 1 nm, 3 nm, or the like.

The volume average particle diameter of colloidal silica is determined by a dynamic light scattering method.

As a measuring device for the volume average particle diameter using the dynamic light scattering method, for example, NANOTRAC UPA (manufactured by Microtrac-BEL Corp.) is used.

The shape of the colloidal silica is not particularly limited as long as the jetting performance of the ink is not disturbed. For example, the colloidal silica may have a spherical shape, a long shape, a needle shape, or a bead shape. Among these, from the viewpoint of the jettability of the ink, it is preferable that the colloidal silica has a spherical shape.

As the colloidal silica, produced colloidal silica or a commercially available product may be used.

Specific examples of the commercially available product include Ludox AM, Ludox AS, Ludox LS, Ludox TM, Ludox HS, and the like (all manufactured by E.I. Du Pont de Nemours & Company); SNOWTEX S, SNOWTEX XS, SNOWTEX 20, SNOWTEX 30, SNOWTEX 40, SNOW-TEX N, SNOWTEX C, SNOWTEX 0, and the like (all manufactured by Nissan Chemical Corporation); Syton C-30, SytonZOO, and the like (all manufactured by Monsanto Company); Nalcoag-1060 and Nalcoag-ID21 to 64 (all manufactured by Nalco Chemical Company); METHANOL SOL, IPA SOL, MEK SOL, and TOLUENE SOL (all manufactured by Fuso Chemical Co., Ltd.); Cataloid-S, Cataloid-F120, Cataloid SI-350, Cataloid SI-500, Cataloid SI-30, Cataloid S-20L, Cataloid S-20H, Cataloid S-30L, Cataloid SI-30H, Cataloid SI-40, OSCAL-1432 (Isopropyl alcohol sol), and the like (all manufactured by JGC Catalyst and Chemicals Ltd.); and ADELITE (manufactured by Adeka Corporation).

Further, examples of the colloidal silica having a bead shape include commercially available products such as SNOWTEX ST-UP, SNOWTEX PS-S, SNOWTEX PS-M, SNOWTEX ST-OUP, SNOWTEX PS-SO, and SNOWTEX PS-MO (all trade names, manufactured by Nissan Chemical Corporation).

(Content of Specific Silicon Compound)

The content of the specific silicon compound is 0.0020% by mass or greater with respect to the total amount of the titanium dioxide particles.

In this manner, the effect of suppressing abrasion deterioration of the ink jet head is exhibited.

The content of the specific silicon compound is preferably 0.0030% by mass or greater, more preferably 0.0050% by mass or greater, still more preferably 0.010% by mass or greater, even still more preferably 0.020% by mass or greater, and even still more preferably 0.040% by mass or greater with respect to the total amount of the titanium dioxide particles.

The upper limit of the content of the specific silicon compound with respect to the total amount of the titanium dioxide particles is not particularly limited. The upper limit thereof may be, for example, 5.0% by mass, 4.0% by mass, 3.0% by mass, 2.0% by mass, or 0.050% by mass.

The content of the specific silicon compound is, for example, preferably in a range of 0.040% by mass to 2.0% by mass with respect to the total amount of the titanium dioxide particles.

From the viewpoint of suppressing abrasion deterioration of the ink jet head, the content of the specific silicon compound is preferably 0.0003% by mass or greater, more preferably 0.0004% by mass or greater, still more preferably 0.001% by mass or greater, and even still more preferably 0.003% by mass or greater with respect to the total amount of the ink.

The upper limit of the content of the specific silicon compound with respect to the total amount of the ink is not particularly limited. The upper limit thereof may be, for example, 1.0% by mass, 0.50% by mass, or 0.30% by mass.

<Polymer Dispersant>

The ink of the present disclosure may contain a polymer dispersant.

In this case, the ink may contain only one or two or more kinds of polymer dispersants.

The polymer dispersant has a function of dispersing titanium dioxide particles in the ink. Therefore, the dispersibility of the titanium dioxide particles in the ink is further improved in a case where the ink contains a polymer dispersant.

In a case where the ink contains a polymer dispersant, the ink is considered to contain dispersed particles containing titanium dioxide particles and a polymer dispersant that interacts (for example, adsorption) with the titanium dioxide particles.

Further, in a case where the ink of the present disclosure contains, for example, self-dispersing titanium dioxide particles as the titanium dioxide particles, the dispersibility of the titanium dioxide particles can be ensured even in a case where the ink does not contain a polymer dispersant.

Therefore, from the viewpoint of the dispersibility of the titanium dioxide particles, the polymer dispersant is not an indispensable component in the ink of the present disclosure.

However, from the viewpoint of further suppressing abrasion deterioration of the ink jet head, it is preferable that the ink of the present disclosure contains a polymer dispersant.

The reason for this is considered to be that the polymer dispersant exhibits a function as a cushion for relaxing the polishing of the ink jet head by the titanium dioxide particles, similarly to the specific silicon compound.

A method of producing the ink of the present disclosure in a case where the ink contains a polymer dispersant is not particularly limited.

The ink of the present disclosure in this case can be produced by a known method of first preparing a dispersion liquid containing a polymer dispersant, a dispersion medium, and titanium dioxide particles and preparing an ink using the obtained dispersion liquid.

Further, the ink of the present disclosure in a case where the ink contains a polymer dispersant may be produced by a phase-transfer emulsification method.

In the present disclosure, "polymer" denotes a compound having a weight-average molecular weight (Mw) of 1000 or greater.

In the present disclosure, the weight-average molecular weight (Mw) denotes a value measured by gel permeation chromatography (GPC).

The measurement according to gel permeation chromatography (GPC) is performed using HLC (registered trademark)-8020GPC (manufactured by Tosoh Corporation) as a measuring device, three columns of TSKgel (registered trademark) Super Multipore HZ-H (manufactured by Tosoh Corporation, 4.6 mmID×15 cm), and tetrahydrofuran (THF) as an eluent. Further, the measurement is performed under measurement conditions of a sample concentration of 0.45% by mass, a flow rate of 0.35 ml/min, a sample injection volume of 10 μL, and a measurement temperature of 40° C. using an RI detector. Further, the calibration curve is prepared using eight samples of "F-40", "F-20", "F-4", "F-1", "A-5000", "A-2500", "A-1000", and "n-propylbenzene" which are "Standard Samples TSK standard, polystyrene" (manufactured by Tosoh Corporation).

As the polymer dispersant, known dispersants can be used without particular limitation.

As the polymer dispersant, for example, the polymer dispersants described in known documents such as paragraphs 0080 to 0096 of JP2016-145312A and paragraphs 0078 to 0108 of WO2013/180074A can be used.

An acrylic resin is preferable as the polymer dispersant.

In the present disclosure, the acrylic resin indicates a polymer (a homopolymer or a copolymer) of a raw material monomer containing at least one selected from the group consisting of acrylic acid, a derivative of acrylic acid (such as acrylic acid ester), methacrylic acid, and a derivative of methacrylic acid (such as methacrylic acid ester).

The weight-average molecular weight (Mw) of the polymer dispersant is preferably in a range of 3,000 to 100,000, more preferably in a range of 4,000 to 80,000, and still more preferably in a range of 5,000 to 60,000.

It is preferable that the polymer dispersant has a structural unit containing an adsorbing group and a structural unit containing an anionic group.

The structural unit containing an anionic group is a structural unit that contributes to dispersibility.

The polymer dispersant may have only one or two or more kinds of structural units containing an anionic group.

Examples of the anionic group include an acid group and a salt thereof.

Examples of the acid group include a carboxy group, a sulfo group, a phosphoric acid group, and a phosphonic acid group. Among these, a carboxy group is particularly preferable.

As the salt of the acid group, an alkali metal salt is preferable, and a sodium salt or a potassium salt is more preferable.

As the structural unit containing an anionic group, at least one of a structural unit derived from (meth)acrylic acid or a structural unit derived from a salt of (meth)acrylic acid is preferable.

In the present disclosure, the structural unit derived from a compound A (for example, (meth)acrylic acid) denotes a structural unit formed by polymerizing the compound A (for example, (meth)acrylic acid).

The adsorbing group in the structural unit containing an adsorbing group has a function of adsorbing to the titanium dioxide particles.

The polymer dispersant may have only one or two or more kinds of structural units containing an adsorbing group.

The adsorbing group contains preferably at least one selected from the group consisting of an aromatic ring structure, an alicyclic structure, and an alkyl group having 6 or more carbon atoms and more preferably at least one selected from the group consisting of an aromatic ring structure and an alicyclic structure.

It is preferable that the structural unit containing an adsorbing group is a structural unit derived from a (meth) acrylate containing an adsorbing group.

The polymer dispersant may be a random polymer (that is, a random copolymer), a block polymer (that is, a block copolymer), or a polymer having a crosslinked structure.

It is preferable that the polymer dispersant contains a block polymer or a polymer having a crosslinked structure. In this case, the polymer dispersant may contain both a block polymer and a polymer having a crosslinked structure.

In a case where the polymer dispersant contains a block polymer or a polymer having a crosslinked structure, abrasion deterioration of the ink jet head can be further suppressed. The reason for this is considered to be that in a case where the polymer dispersant contains a block polymer or a polymer having a crosslinked structure, the titanium dioxide particles are more densely coated with the polymer dispersant in the ink, and as a result, the function as a cushion described above (that is, the function as a cushion for relaxing the polishing of the ink jet head by the titanium dioxide particles) is more effectively exhibited.

—Block Polymer—

The block polymer is also referred to as a block copolymer, and is a copolymer in which at least two polymers are bonded to each other in a molecule.

It is preferable that the block polymer has a structural unit derived from a hydrophobic monomer and a structural unit derived from a monomer containing an anionic group (hereinafter, referred to as "anionic group-containing monomer").

The structural unit derived from a hydrophobic monomer contained in the block polymer may be used alone or two or more kinds thereof. The structural unit derived from an anionic group-containing monomer contained in the block polymer may be used alone or two or more kinds thereof.

Examples of the structural unit derived from a hydrophobic monomer include an ethylenically unsaturated compound having an aromatic ring structure or an alicyclic structure and a (meth)acrylate containing an alkyl group having 1 to 20 carbon atoms.

The content of the structural unit derived from a hydrophobic monomer is preferably in a range of 35% by mass to 95% by mass, more preferably in a range of 50% by mass to 95% by mass, and still more preferably in a range of 70% by mass to 90% by mass with respect to the total amount of the block polymer.

From the viewpoint of the adsorptivity to the pigment, the hydrophobic monomer contains preferably an ethylenically unsaturated compound having an aromatic ring structure or an alicyclic structure, more preferably an ethylenically unsaturated compound having an alicyclic structure, and still more preferably an ethylenically unsaturated compound having an alicyclic structure having 6 or more carbon atoms.

The content of the structural unit derived from the ethylenically unsaturated compound having an aromatic ring structure or an alicyclic structure is preferably in a range of 10% by mass to 90% by mass, more preferably in a range of 20% by mass to 80% by mass, still more preferably in a range of 30% by mass to 70% by mass, and even still more preferably in a range of 30% by mass to 60% by mass with respect to the total amount of the block polymer.

It is also preferable that the structural unit derived from the hydrophobic monomer contains a (meth)acrylate containing an alkyl group having 1 to 20 carbon atoms. The alkyl group may be any of linear or branched.

Examples of the (meth)acrylate containing an alkyl group having 1 to 20 carbon atoms include methyl (meth)acrylate, ethyl (meth)acrylate, n-propyl (meth)acrylate, n-butyl (meth)acrylate, 2-ethylhexyl (meth)acrylate, and octyl (meth)acrylate.

The content of the structural unit derived from a (meth) acrylate containing an alkyl group having 1 to 20 carbon atoms is preferably in a range of 10% by mass to 90% by mass, more preferably in a range of 20% by mass to 80% by mass, still more preferably in a range of 30% by mass to 70% by mass, and particularly preferably in a range of 40% by mass to 60% by mass with respect to the total amount of the block polymer.

Examples of the anionic group in the structural unit derived from an anionic group-containing monomer include a carboxy group, a salt of the carboxy group, a sulfo group, a salt of the sulfo group, a phosphoric acid group, a salt of the phosphoric acid group, a phosphonic acid group, and a salt of the phosphonic acid group.

Examples of the counterion in a salt include an alkali metal ion such as a sodium ion, a potassium ion, or a lithium ion, an alkaline earth metal ion such as a calcium ion or a magnesium ion, and an ammonium ion.

Among these, a carboxy group or a salt of the carboxy group is preferable as the anionic group. Examples of the anionic group-containing monomer include (meth)acrylic acid, β-carboxyethyl acrylate, fumaric acid, itaconic acid, maleic acid, and crotonic acid. Among these, (meth)acrylic acid is preferable as the anionic group-containing monomer.

The content of the structural unit derived from the anionic group-containing monomer is preferably in a range of 1% by mass to 30% by mass, more preferably in a range of 2% by mass to 25% by mass, and still more preferably in a range of 3% by mass to 20% by mass with respect to the total amount of the block polymer.

Whether or not the polymer contained in the ink is a block polymer can be determined by, for example, the following method. First, the polymer is separated from the ink by a separation method such as solvent extraction. The physical properties such as the glass transition temperature are measured by performing analysis on the separated polymer using various analysis methods such as a nuclear magnetic resonance method (NMR), an infrared spectroscopy method (IR), and a thermal analysis method, and thus it is possible to comprehensively determine whether the polymer is a block polymer.

The weight-average molecular weight (Mw) of the block polymer is not particularly limited, but is preferably in a range of 3,000 to 100,000, more preferably in a range of 5,000 to 80,000, and still more preferably in a range of 10,000 to 60,000 from the viewpoint of the dispersibility of the pigment.

—Polymer Having Crosslinked Structure—

The polymer having a crosslinked structure is not particularly limited as long as the polymer is a polymer having at least one crosslinked structure in a molecule.

The polymer having a crosslinked structure (hereinafter, also referred to as "crosslinked polymer") is formed by, for example, crosslinking an uncrosslinked polymer with a crosslinking agent.

It is preferable that the uncrosslinked polymer is a water-soluble polymer.

Examples of the uncrosslinked polymer include polyvinyl, polyurethane, and polyester. Among these, polyvinyl is preferable as the uncrosslinked polymer.

It is preferable that the uncrosslinked polymer is a polymer containing a functional group that can be crosslinked by a crosslinking agent. Examples of the crosslinkable functional group include a carboxy group or a salt thereof, an isocyanate group, and an epoxy group.

Among these, from the viewpoint of improving the dispersibility of the titanium dioxide particles, a carboxy group or a salt thereof is preferable, and a carboxy group is particularly preferable as the crosslinkable functional group. That is, a polymer containing a carboxy group is preferable as the uncrosslinked polymer.

It is preferable that the uncrosslinked polymer is a copolymer having a structural unit derived from a monomer containing a carboxy group (hereinafter, referred to as "carboxy group-containing monomer"). The structural unit derived from a carboxy group-containing monomer contained in a copolymer may be used alone or two or more kinds thereof. The copolymer may be a random copolymer or a block copolymer, but is preferably a random copolymer.

Examples of the carboxy group-containing monomer include (meth)acrylic acid, β-carboxyethyl acrylate, fumaric acid, itaconic acid, maleic acid, and crotonic acid.

From the viewpoints of the crosslinking properties and the dispersibility, (meth)acrylic acid or β-carboxyethyl acrylate is preferable, and (meth)acrylic acid is more preferable as the carboxy group-containing monomer.

The content of the structural unit derived from the carboxy group-containing monomer, which can be contained in the uncrosslinked polymer, is preferably in a range of 1% by mass to 30% by mass, more preferably in a range of 2% by mass to 25% by mass, and still more preferably in a range of 3% by mass to 20% by mass with respect to the total amount of the block polymer.

It is preferable that the uncrosslinked polymer has a structural unit derived from a hydrophobic monomer in addition to the structural unit derived from a carboxy group-containing monomer.

The structural unit derived from a hydrophobic monomer may be used alone or two or more kinds thereof.

Examples of the structural unit derived from a hydrophobic monomer that can be contained in the uncrosslinked polymer include a structural unit derived from an ethylenically unsaturated compound having an aromatic ring structure or an alicyclic structure and a structural unit derived from a (meth)acrylate that contains an alkyl group having 1 to 20 carbon atoms.

The preferable aspects of these structural units that can be contained in an uncrosslinked polymer are the same as the preferable aspects of these structural units that can be contained in a block polymer.

The content of the structural unit derived from a hydrophobic monomer in the uncrosslinked polymer is preferably in a range of 35% by mass to 95% by mass, more preferably in a range of 50% by mass to 95% by mass, and still more preferably in a range of 70% by mass to 90% by mass with respect to the total amount of the uncrosslinked polymer.

Similarly, the content of the structural unit derived from a hydrophobic monomer in the crosslinked polymer is preferably in a range of 35% by mass to 95% by mass, more preferably in a range of 50% by mass to 95% by mass, and still more preferably in a range of 70% by mass to 90% by mass with respect to the total amount of the crosslinked polymer.

The uncrosslinked polymer and the crosslinked polymer may each have, as the structural unit derived from a hydrophobic monomer, a (meth)acrylate constitutional unit having a benzene ring and a (meth)acrylate constitutional unit containing an alkyl group having 12 or more carbon atoms.

The content of the (meth)acrylate constitutional unit having a benzene ring is preferably in a range of 20% by mass to 60% by mass with respect to the total amount of the polymer (that is, the uncrosslinked polymer or the crosslinked polymer).

The content of the (meth)acrylate constitutional unit containing an alkyl group having 12 or more carbon atoms is preferably in a range of 10% by mass to 40% by mass with respect to the total amount of the polymer (that is, the uncrosslinked polymer or the crosslinked polymer).

From the viewpoint of the dispersibility of the pigment, the acid value of the uncrosslinked polymer is preferably in a range of 67 mgKOH/g to 200 mgKOH/g and more preferably in a range of 67 mgKOH/g to 150 mgKOH/g. In the present disclosure, the acid value is a value measured by the method described in JIS K 0070: 1992.

Further, from the viewpoint of suppressing breakage of an image to be recorded and improving the image quality of the image to be recorded, the acid value of the crosslinked polymer is preferably in a range of 35 mgKOH/g to 185 mgKOH/g, more preferably in a range of 50 mgKOH/g to 150 mgKOH/g, and still more preferably in a range of 80 mgKOH/g to 130 mgKOH/g. In a case where the acid value of the crosslinked polymer is 50 mgKOH/g or greater, the image quality of an image to be recorded is more excellent. Further, in a case where the acid value of the crosslinked polymer is 150 mgKOH/g or less, breakage of an image to be recorded is further suppressed.

The weight-average molecular weight (Mw) of the uncrosslinked polymer is not particularly limited, but is preferably in a range of 3000 to 100000, more preferably in a range of 4000 to 80000, still more preferably in a range of 5000 to 60000, and even still more preferably in a range of 10000 to 60000 from the viewpoint of the dispersibility of the pigment.

The preferable ranges of the weight-average molecular weight (Mw) of the crosslinked polymer are the same as the preferable ranges of the weight-average molecular weight (Mw) of the uncrosslinked polymer.

It is preferable that the crosslinking agent used in a case of crosslinking the uncrosslinked polymer is a compound having two or more reaction sites with the uncrosslinked polymer (for example, a polymer containing a carboxy group). The crosslinking agent may be used alone or in combination of two or more kinds thereof.

As a combination of the crosslinking agent and the uncrosslinked polymer, a combination of a compound containing two or more epoxy groups (that is, a bi- or higher functional epoxy compound) and a polymer containing a carboxy group is preferable. In this combination, a crosslinked structure is formed by the reaction between the epoxy group and the carboxy group. It is preferable that the crosslinked structure is formed by the crosslinking agent after the pigment is dispersed by the uncrosslinked polymer.

Examples of the bi- or higher functional epoxy compound include ethylene glycol diglycidyl ether, polyethylene glycol diglycidyl ether, 1,6-hexanediol diglycidyl ether, diethylene glycol diglycidyl ether, dipropylene glycol diglycidyl ether, polypropylene glycol diglycidyl ether, and trimethylolpropane triglycidyl ether.

Among these, polyethylene glycol diglycidyl ether, diethylene glycol diglycidyl ether, or trimethylolpropane triglycidyl ether is preferable as the bi- or higher functional epoxy compound.

Commercially available products may be used as the crosslinking agent.

Examples of the commercially available products include Denacol EX-321, EX-821, EX-830, EX-850, and EX-851 (manufactured by Nagase ChemteX Corporation).

From the viewpoints of the crosslinking reaction rate and the dispersion stability after crosslinking, the molar ratio between a reaction site (for example, an epoxy group) in the crosslinking agent and a reaction site (for example, a carboxy group) in the uncrosslinked polymer is preferably in a range of 1:1.1 to 1:10, more preferably in a range of 1:1.1 to 1:5, and still more preferably in a range of 1:1.1 to 1:3.

<Water-Soluble Organic Solvent>

It is preferable that the ink of the present disclosure contains at least one kind of water-soluble organic solvent. In this manner, the jettability of the ink from the ink jet head is further improved.

The content of the water-soluble organic solvent is preferably in a range of 5% by mass to 60% by mass, more preferably in a range of 10% by mass to 40% by mass, and still more preferably in a range of 15% by mass to 30% by mass with respect to the total amount of the ink.

—Water-Soluble Organic Solvent Having Boiling Point of Lower than 220° C. —

The ink may contain at least one water-soluble organic solvent having a boiling point of lower than 220° C. as the water-soluble organic solvent.

In this manner, the drying properties of the ink (that is, the drying properties of an image to be recorded) are further improved.

In the present disclosure, the boiling point denotes a boiling point at 1 atm (101325 Pa).

Examples of the water-soluble organic solvent having a boiling point of lower than 220° C. include 1,2-propanediol (also referred to as propylene glycol; PG) (boiling point of 188° C.), 1,3-propanediol (boiling point of 213° C.), propylene glycol monomethyl ether (boiling point of 121° C.), ethylene glycol (boiling point of 197° C.), ethylene glycol monomethyl ether (boiling point of 124° C.), propylene glycol monoethyl ether (boiling point of 133° C.), ethylene glycol monoethyl ether (boiling point of 135° C.), propylene glycol monopropyl ether (boiling point of 149° C.), ethylene glycol monopropyl ether (boiling point of 151° C.), propylene glycol monobutyl ether (boiling point of 170° C.), ethylene glycol monobutyl ether (boiling point of 171° C.), 2-ethyl-1-hexanol (boiling point of 187° C.), dipropylene glycol monomethyl ether (boiling point of 188° C.), diethylene glycol dimethyl ether (boiling point of 162° C.), diethylene glycol diethyl ether (boiling point of 188° C.), and dipropylene glycol dimethyl ether (boiling point of 175° C.).

In a case where the ink of the present disclosure contains a water-soluble organic solvent having a boiling point of lower than 220° C., the content of the water-soluble organic solvent having a boiling point of lower than 220° C. is preferably in a range of 1% by mass to 50% by mass, more preferably in a range of 5% by mass to 40% by mass, still more preferably in a range of 10% by mass to 40% by mass, and even still more preferably in a range of 15% by mass to 35% by mass with respect to the total amount of the ink.

—Water-Soluble Organic Solvent Having Boiling Point of 220° C. or Higher—

The content of the water-soluble organic solvent having a boiling point of 220° C. or higher (hereinafter, also referred to as "high-boiling point solvent") in the ink of the present disclosure is preferably 5% by mass or less. In this manner, the drying properties of the ink (that is, the drying properties of an image to be recorded) are further improved.

Here, the expression "the content of the water-soluble organic solvent having a boiling point of 220° C. or higher in the ink is 5% by mass or less" denotes that the ink does not contain the water-soluble organic solvent having a boiling point of 220° C. or higher (that is, the content of the water-soluble organic solvent having a boiling point of 220° C. or higher in the ink is 0% by mass) or even in a case where the ink contains the water-soluble organic solvent having a boiling point of 220° C. or higher, the content of the water-soluble organic solvent having a boiling point of 220° C. or higher is 5% by mass or less with respect to the total amount of the ink.

The content of the water-soluble organic solvent having a boiling point of 220° C. or higher in the ink is more preferably 3% by mass or less, still more preferably 2% by mass or less, even still more preferably 1% by mass or less, and even still more preferably 0% by mass.

Examples of the water-soluble organic solvent having a boiling point of 220° C. or higher include glycerin (boiling point of 290° C.), 1,2-hexanediol (HDO) (boiling point of 223° C.), diethylene glycol (boiling point of 245° C.), diethylene glycol monobutyl ether (boiling point of 230° C.), triethylene glycol (boiling point of 285° C.), dipropylene glycol (boiling point of 232° C.), tripropylene glycol (boiling point 267° C.), trimethylolpropane (boiling point of 295° C.), 2-pyrrolidone (boiling point of 245° C.), tripropylene glycol monomethyl ether (boiling point of 243° C.), and triethylene glycol monomethyl ether (boiling point of 248° C.).

<Resin Particles>

The ink of the present disclosure may contain at least one kind of resin particles.

In a case where the ink contains resin particles, the adhesiveness of the image to be recorded is further improved.

Here, the resin particles are distinguished from the polymer dispersant in terms that the resin particles are particles consisting of a resin.

A water-insoluble resin is preferable as the resin constituting the resin particles.

Further, in the case where the ink contains resin particles, an increase in viscosity of the ink is further suppressed as compared with a case where the ink contains the same mass of a water-soluble resin as the mass of the resin particles. As a result, the jettability (hereinafter, also simply referred to as "jettability of the ink") of the ink from an ink jet head in a case of using the ink as an ink jet ink is further improved.

The definition and the preferable range of "water-soluble" are as described above.

The term "water-insoluble" denotes a property that the amount of a substance to be dissolved in 100 g of distilled water at 25° C. is less than 1 g.

The glass transition temperature of the resin particles (that is, the glass transition temperature of the resin in the resin particles) is not particularly limited.

From the viewpoint of further improving the strength of the image, the glass transition temperature (Tg) of the resin particles is preferably 20° C. or higher, more preferably 50° C. or higher, and still more preferably 80° C. or higher.

From the viewpoint of the manufacturing suitability of the resin particles, the glass transition temperature (Tg) of the resin particles is preferably 200° C. or lower, more preferably 150° C. or lower, and still more preferably 130° C. or lower.

As the resin particles, particles consisting of an acrylic resin (hereinafter, also referred to as acrylic resin particles), particles consisting of a polyester resin (hereinafter, also referred to as polyester resin particles), particles consisting of a polyurethane resin (hereinafter, also referred to as polyurethane resin particles), or particles consisting of a polyolefin resin (hereinafter, also referred to as polyolefin resin particles) are preferable.

Further, in the present disclosure, the polyester resin indicates a polymer compound having an ester bond in the main chain. Examples of the polyester resin include a polycondensate of polyvalent carboxylic acid (such as dicarboxylic acid) and polyalcohol (such as a diol).

Further, in the present disclosure, the polyolefin resin indicates a polymer (a homopolymer or a copolymer) of a raw material monomer containing an olefin. Examples of the polyolefin resin include a polymer of one kind of olefin, a copolymer of two or more kinds of olefins, and a copolymer of one or more kinds of olefins and one or more kinds of other monomers. Examples of the olefin include an α-olefin having 2 to 30 carbon atoms.

In the present disclosure, the polyurethane resin indicates a polymer compound having a urethane bond.

From the viewpoint of further improving the adhesiveness and the rub resistance of the image, it is preferable that the resin particles contained in the ink include acrylic resin particles.

In a case where the resin particles contained in the ink include acrylic resin particles, the proportion of the acrylic resin particles in the resin particles contained in the ink is preferably 60% by mass or greater, more preferably 80% by mass or greater, and still more preferably 90% by mass or greater.

In a case where the proportion of the acrylic resin particles in the resin particles contained in the ink is 60% by mass or greater, the adhesiveness of the image is further improved.

As the resin particles, self-dispersing resin particles are preferable.

Examples of the self-dispersing resin particles include self-dispersing polymer particles described in paragraphs 0062 to 0076 of JP2016-188345A and paragraphs 0109 to 0140 of WO2013/180074A.

The resin in the resin particles has preferably an alicyclic structure or an aromatic ring structure and more preferably an alicyclic structure.

As the alicyclic structure, an alicyclic hydrocarbon structure having 5 to 10 carbon atoms is preferable, and a cyclohexane ring structure, a dicyclopentanyl ring structure, a dicyclopentenyl ring structure, a norbornane ring structure, an isobornane ring structure, a norbornene ring structure, an isobornene ring structure, or an adamantane ring structure is preferable.

As the aromatic ring structure, a naphthalene ring or a benzene ring is preferable, and a benzene ring is more preferable.

The amount of the alicyclic structure or the aromatic ring structure is, for example, preferably in a range of 0.01 mol to 1.5 mol and more preferably in a range of 0.1 mol to 1 mol per 100 g of the resin contained in the resin particles.

From the viewpoint of further improving the dispersibility of the resin particles in water, it is preferable that the resin contained in the resin particles contains an ionic group in the structure.

The ionic group may be an anionic group or a cationic group, but an anionic group is preferable.

The anionic group is not particularly limited, but a carboxy group, a salt of the carboxy group, a sulfo group, or a salt of the sulfo group is preferable.

As the resin in the resin particles, an acrylic resin having at least one selected from the group consisting of a benzyl (meth)acrylate unit, a phenoxyethyl (meth)acrylate unit, and an alicyclic structure-containing (meth)acrylate unit and a (meth)acrylic acid unit is more preferable, and an acrylic resin having at least one selected from the group consisting of a benzyl (meth)acrylate unit, a phenoxyethyl (meth) acrylate unit, and an alicyclic structure-containing (meth) acrylate unit, a (meth)acrylic acid unit, and an alkyl (meth)

acrylate unit containing an alkyl group having 1 to 4 carbon atoms is still more preferable.

As the alicyclic structure-containing (meth)acrylate, at least one selected from alkyl (meth)acrylate containing a cycloalkyl group having 3 to 10 carbon atoms (such as cyclohexyl (meth)acrylate), isobornyl (meth)acrylate, adamantyl (meth)acrylate, and dicyclopentanyl (meth)acrylate is preferable, and at least one selected from isobornyl (meth)acrylate, adamantyl (meth)acrylate, and dicyclopentanyl (meth)acrylate is more preferable.

From the viewpoint of the self-dispersibility, the aggregating properties in a case of image recording, and the like, the acid value of the resin in the resin particles is preferably in a range of 25 mgKOH/g to 100 mgKOH/g, more preferably in a range of 30 mgKOH/g to 90 mgKOH/g, and still more preferably in a range of 35 mgKOH/g to 80 mgKOH/g.

The molecular weight of the resin in the resin particles is preferably in a range of 1000 to 300000, more preferably in a range of 2000 to 200000, and still more preferably in a range of 5000 to 100000 in terms of the weight-average molecular weight.

The weight-average molecular weight is measured by gel permeation chromatography (GPC). The details of GPC are as described above.

The volume average particle diameter of the resin particles is preferably in a range of 1 nm to 200 nm, more preferably in a range of 3 nm to 200 nm, and still more preferably in a range of 5 nm to 50 nm.

In a case where the ink contains resin particles, the content of the resin particles is preferably in a range of 1% by mass to 25% by mass, more preferably in a range of 2% by mass to 20% by mass, still more preferably in a range of 2% by mass to 15% by mass, and even still more preferably in a range of 2% by mass to 10% by mass with respect to the total amount of the ink.

<Surfactant>

The ink of the present disclosure may contain at least one surfactant.

Examples of the surfactant include a nonionic surfactant, a cationic surfactant, an anionic surfactant, and a betaine surfactant.

Preferred examples of the surfactant include an acetylene glycol-based surfactant, which is a kind of a nonionic surfactant.

As the acetylene glycol-based surfactant, for example, the acetylene glycol-based surfactants described in paragraphs 0070 to 0080 of WO2017/149917A can be used.

Examples of the acetylene glycol-based surfactant include a polyalkylene oxide adduct (preferably a polyethylene oxide adduct) of 2,4,7,9-tetramethyl-5-decyne-4,7-diol, a polyalkylene oxide adduct (preferably a polyethylene oxide adduct) of 3,6-dimethyl-4-octyne-3,6-diol, a polyalkylene oxide adduct (preferably a polyethylene oxide adduct) of 2,5,8,11-tetramethyl-6-dodecyne-5,8-diol, and a polyalkylene oxide adduct (preferably a polyethylene oxide adduct) of 2,5-dimethyl-3-hexyne-2,5-diol.

Examples of commercially available products of the acetylene glycol-based surfactant include the SURFYNOL Series (such as SURFYNOL 420, SURFYNOL 440, SURFYNOL 465, and SURFYNOL 485), OLFINE Series (such as OLFINE E1010 and OLFINE E1020), and DYNOL Series (such as DYNOL 604) (all manufactured by Air Products and Chemicals Inc. or Nissin Chemical Co., Ltd.), and ACETYLENOL (manufactured by Kawaken Fine Chemicals Co., Ltd.).

Commercially available products of the acetylene glycol-based surfactants are also provided by The Dow Chemical Company, General Aniline & Film Corporation, and the like.

The surfactant may include a fluorine-based surfactant.

Examples of a commercially available product of the fluorine-based surfactant include Capstone FS-63 and Capstone FS-61 (manufactured by DuPont), FTERGENT 100, FTERGENT 110, and FTERGENT 150 (manufactured by Neos Co., Ltd.), and CHEMGUARD S-760P (manufactured by Chemguard Inc.).

Examples of the surfactant include compounds exemplified as surfactants in pp. 37 and 38 of JP1984-157636A (JP-S59-157636A) and Research Disclosure No. 308119 (1989). Further, other examples of the surfactant include fluorine-based (fluorinated alkyl-based) surfactants and silicone-based surfactants described in JP2003-322926A, JP2004-325707A, and JP2004-309806A.

In a case where the ink contains a surfactant, the content of the surfactant in the ink is appropriately adjusted in consideration of the surface tension of the ink.

The content of the surfactant in the ink is preferably in a range of 0.01% by mass to 5% by mass, more preferably in a range of 0.05% by mass to 3% by mass, and still more preferably in a range of 0.1% by mass to 2% by mass with respect to the total amount of the ink.

<Other Components>

The ink may contain components other than the components described above.

Examples of other components include known additives such as urea, a urea derivative, a wax, a fading inhibitor, an emulsion stabilizer, a penetration enhancer, an ultraviolet absorbing agent, a preservative, a fungicide, a pH adjuster, an antifoaming agent, a viscosity adjuster, a dispersion stabilizer, and a chelating agent.

<Preferable Physical Properties of Ink>

The viscosity of the ink of the present disclosure is preferably in a range of 1.2 mPa s to 15.0 mPa s, more preferably 2 mPa s or greater and less than 13 mPa s, and preferably 2.5 mPa·s or greater and less than 10 mPa-s.

The viscosity is a value measured at 25° C. using a viscometer.

As the viscometer, for example, a VISCOMETER TV-22 type viscometer (manufactured by Toki Sangyo Co., Ltd.) can be used.

The surface tension of the ink of the present disclosure is preferably in a range of 25 mN/m to 40 mN/m and more preferably in a range of 27 mN/m to 37 mN/m.

The surface tension is a value measured at a temperature of 25° C.

The surface tension can be measured using, for example, an Automatic Surface Tensiometer CBVP-Z (manufactured by Kyowa Interface Science Co., Ltd.).

From the viewpoint of the dispersion stability, the pH of the ink of the present disclosure at 25° C. is preferably in a range of 6 to 11, more preferably in a range of 7 to 10, and still more preferably in a range of 7 to 9.

The pH of the ink at 25° C. is measured using a commercially available pH meter.

[Ink Set]

First Embodiment

An ink set according to a first embodiment of the present disclosure includes a white ink which is the ink of the present disclosure described above and a colored ink containing water and a color pigment.

According to the ink set of the first embodiment, a multicolor image using a white ink and a colored ink can be recorded.

Examples of the multicolor image include a multicolor image A in which a color pattern image (such as a character or a FIGURE) recorded with a colored ink and a solid image-like white image recorded to cover the pattern image with a white ink are disposed on a base material in this order; a multicolor image B in which a solid image-like color image recorded with a colored ink and a white pattern image (such as a character or a FIGURE) recorded with a white ink on the color image are disposed on a base material in this order; a multicolor image C in which a white pattern image (such as a character or a FIGURE) recorded with a white ink and a solid image-like color image recorded to cover the pattern image with a colored ink are disposed on a base material in this order; and a multicolor image D in which a solid image-like white image recorded with a white ink and a color pattern image (such as a character or a FIGURE) recorded with a colored ink on the white image are disposed on a base material in this order.

In the multicolor images A and C, the pattern images are visually recognized through the base material from the rear surface side (that is, the surface side where the image is not formed) of the base material. The image recording in such an aspect is generally referred to as "reverse printing".

Since the ink set of the first embodiment includes the ink of the present disclosure described above, the same effects as the effects of the ink of the present disclosure are exhibited.

The concept of "color" in the first embodiment includes both chromatic colors such as cyan, magenta, yellow, red, blue, and green, and black.

<Colored Ink>

The ink set of the first embodiment includes a colored ink containing water and a color pigment.

The ink set of the first embodiment may include only one or two or more kinds of colored inks.

(Water)

The colored ink contains water.

The content of water is preferably 30% by mass or greater, more preferably 40% by mass or greater, still more preferably 50% by mass or greater, and even still more preferably 60% by mass or greater with respect to the total amount of the colored ink.

The upper limit of the content of water is appropriately determined according to the content of other components. The upper limit of the content of water may be 90% by mass, 80% by mass, or the like.

(Color Pigment)

The colored ink contains at least one color pigment. Here, the colored ink denotes an ink other than the white ink.

Examples of the color pigment include chromatic pigments such as cyan, magenta, yellow, red, blue, green, violet, pink, orange, and brown, and a black pigment.

Examples of the color pigment include the pigments described in "Pigment Dictionary" (2000), edited by Seijiro Ito, "Industrial Organic Pigments", written by W. Herbst, K. Hunger, "Handbook of Organic Pigments" (2006), written by Isao Hashimoto, JP2002-12607A, JP2002-188025A, JP2003-26978A, and JP2003-342503A.

The content of the color pigment is preferably in a range of 0.5% by mass to 10% by mass and more preferably in a range of 0.5% by mass to 5% by mass with respect to the total amount of the colored ink.

(Silicon Compound)

It is preferable that the colored ink contains at least one silicon compound selected from the group consisting of a silicate and colloidal silica.

In this manner, dissolution deterioration and abrasion deterioration of the ink jet head for jetting the colored ink are further suppressed.

Hereinafter, a silicon compound which is contained in the white ink and is at least one selected from the group consisting of a silicate and colloidal silica will also be referred to as a first silicon compound, and a silicon compound which is contained in the colored ink and is at least one selected from the group consisting of a silicate and colloidal silica will also be referred to as a second silicon compound.

The preferable aspects of the second silicon compound are the same as the preferable aspects of the first silicon compound.

In the ink set of the first embodiment, in a case where the content of the first silicon compound with respect to the total amount of the white ink is defined as X1% by mass and the content of the second silicon compound with respect to the total amount of the colored ink is defined as X2% by mass, the ratio of X1/X2 is preferably 5.0 or less, more preferably 4.0 or less, still more preferably 1.0 or less, even still more preferably less than 1.0, even still more preferably 0.9 or less, and even still more preferably 0.5 or less from the viewpoint of the definition of the image.

In a case where the ratio of X1/X2 is 5.0 or less, the definition of the image is further improved.

The effect of improving the definition of the image by limiting the ratio of X1/X2 to 5.0 or less is particularly effectively exhibited particularly in an aspect of recording an image by applying the pretreatment liquid described below, the colored ink, and the white ink onto a base material in this order.

Specifically, in a case where the ratio of X1/X2 is limited to 5.0 or less in the above-described aspect, since the content of the silicon compound is limited in the white ink applied after the colored ink, an increase in pH of the white ink is limited, and as a result, an effect of aggregating the components in the white ink using the pretreatment liquid can be more effectively exhibited. As a result, the definition of the image is further improved in a multicolor image recorded with the colored ink and the white ink.

Examples of the above-described aspect include an aspect in which a pattern image of a character, a FIGURE, or the like is recorded with the colored ink and a white image (such as a white solid image) is recorded with the white ink to cover the pattern image. In this case, the pattern image is visually recognized through the base material from the surface side of the base material where the image is not recorded.

The lower limit of the ratio of X1/X2 is not particularly limited.

From the viewpoint of more effectively exhibiting the effects of the first silicon compound in the white ink, the lower limit thereof is preferably 0.01 and more preferably 0.02.

In the first embodiment, from the viewpoint of further improving the definition of the image, it is preferable that the first silicon compound contains a silicate and the second silicon compound contains colloidal silica.

The effect of improving the definition of the image by allowing the first silicon compound to contain a silicate and allowing the second silicon compound to contain colloidal silica is particularly effectively exhibited in an aspect of recording an image by applying the pretreatment liquid described below, the colored ink, and the white ink onto a base material in this order.

The reason for this is assumed as follows.

Specifically, in the image recording described above, the aggregating agent in the pretreatment liquid is consumed by the specific silicon compound (that is, the colloidal silica and/or the silicate) in the ink. Here, the amount of the aggregating agent to be consumed by the colloidal silica is considered to be less than the amount of the aggregating agent to be consumed by the silicate. Therefore, it is considered that in a case where the second silicon compound in the colored ink contains colloidal silica, the amount of the aggregating agent to be consumed at a stage where the colored ink has been applied can be suppressed so that the aggregating agent remains, and thus the amount of the aggregating agent acting on the white ink to be applied after the colored ink can be ensured. As a result, it is considered that the effect of aggregating the components in the white ink using the pretreatment liquid can be more effectively exhibited and the definition of the image in the multicolor image recorded with the colored ink and the white ink can be further improved.

<Pretreatment Liquid>

It is preferable that the ink set of the first embodiment contains a pretreatment liquid containing water and an aggregating agent.

The function of the aggregating agent in the pretreatment liquid is to aggregate the components in the ink.

In this manner, an image having excellent adhesiveness to a base material, excellent definition, and the like can be recorded.

In the image recording using the pretreatment liquid, the pretreatment liquid is applied to the base material before the application of the colored ink and the white ink, and the colored ink and the white ink are respectively applied onto the region of the base material where the pretreatment liquid has been applied. In this manner, for example, the above-described multicolor image is recorded.

(Water)

The pretreatment liquid contains water.

The content of water is preferably 50% by mass or greater and more preferably 60% by mass or greater with respect to the total amount of the pretreatment liquid.

The upper limit of the content of water depends on the amount of other components, but is preferably 90% by mass or less with respect to the total amount of the pretreatment liquid.

(Aggregating Agent)

The pretreatment liquid contains at least one aggregating agent.

The aggregating agent is a component for aggregating the components in the ink on the impermeable base material.

At least one selected from the group consisting of an organic acid, an organic acid salt, a polyvalent metal compound, a metal complex, and a water-soluble cationic polymer is preferable as the aggregating agent.

—Organic Acid—

As the organic acid, an organic compound containing an acidic group is exemplified.

Examples of the acidic group include a phosphoric acid group, a phosphonic acid group, a phosphinic acid group, a sulfuric acid group, a sulfonic acid group, a sulfinic acid group, and a carboxy group.

From the viewpoint of the aggregation rate of the ink, a phosphoric acid group or a carboxy group is preferable, and a carboxy group is more preferable as the acidic group.

Further, it is preferable that at least a part of the acidic group is dissociated in the pretreatment liquid.

Preferred examples of the organic compound containing a carboxy group include polyacrylic acid, acetic acid, formic acid, benzoic acid, glycolic acid, malonic acid, malic acid (preferably DL-malic acid), maleic acid, succinic acid, glutaric acid, fumaric acid, citric acid, tartaric acid, phthalic acid, adipic acid, pimelic acid, 4-methylphthalic acid, lactic acid, pyrrolidone carboxylic acid, pyrrone carboxylic acid, pyrrole carboxylic acid, furan carboxylic acid, pyridine carboxylic acid, coumaric acid, thiophene carboxylic acid, nicotinic acid, and pimelic acid. These compounds may be used alone or in combination of two or more kinds thereof.

From the viewpoint of the aggregation rate of the ink, as the organic compound containing a carboxy group, a di- or higher valent carboxylic acid (hereinafter, also referred to as a polyvalent carboxylic acid) is preferable.

As the polyvalent carboxylic acid, dicarboxylic acid or tricarboxylic acid is preferable, glutaric acid, malonic acid, succinic acid, adipic acid, pimelic acid, malic acid, maleic acid, fumaric acid, tartaric acid, or citric acid is more preferable, glutaric acid, malonic acid, succinic acid, adipic acid, pimelic acid, malic acid, fumaric acid, tartaric acid, or citric acid is still more preferable, and glutaric acid, malonic acid, succinic acid, adipic acid, or pimelic acid is even still more preferable.

It is preferable that the organic acid has a low pKa (for example, 1.0 to 5.0).

In this manner, the surface charge of particles such as polymer particles or the pigment stably dispersed in the ink by a weakly acidic functional group such as a carboxy group is reduced by bringing the ink into contact with an organic acidic compound having a lower pKa to degrade the dispersion stability.

It is preferable that the organic acid has a low pKa and a high solubility in water and is di- or higher valent and more preferable that the organic acid is a di- or trivalent acidic substance which has a high buffer capacity in a pH region whose pKa is lower than the pKa of the functional group (for example, a carboxy group) that allows the particles to be stably dispersed in the ink.

—Organic Acid Salt—

Examples of the organic acid salt include salts of organic acids exemplified above.

Examples of the organic acid salt include organic acid salts containing alkaline earth metals of a group 2 (such as magnesium and calcium) in the periodic table, transition metals of a group 3 (such as lanthanum) in the periodic table, cations of a group 13 (such as aluminum) in the periodic table, and lanthanides (such as neodymium).

As the organic acid salt, an organic acid salt containing an alkaline earth metal is preferable, an organic acid salt containing calcium (such as calcium lactate or calcium acetate), or an organic acid salt containing magnesium (such as magnesium lactate or magnesium acetate) is preferable.

—Polyvalent Metal Compound—

Examples of the polyvalent metal compound include a salt (here, excluding the organic acid salt) containing at least one selected from the group consisting of alkaline earth metals of a group 2 (such as magnesium and calcium) in the periodic table, transition metals of a group 3 (such as lanthanum) in the periodic table, cations of a group 13 (such as aluminum) in the periodic table, and lanthanides (such as neodymium).

As the polyvalent metal compound, a nitrate, a chloride, or a thiocyanate is suitable.

As the polyvalent metal compound, a calcium salt or a magnesium salt of nitric acid, calcium chloride, magnesium chloride, or a calcium salt or a magnesium salt of thiocyanic acid is particularly preferable.

Further, it is preferable that at least a part of the polyvalent metal compound is dissociated into polyvalent metal ions and counterions in the pretreatment liquid.

—Metal Complex—

As the metal complex, a metal complex including at least one selected from the group consisting of zirconium, aluminum, and titanium as a metallic element is preferable.

As the metal complex, a metal complex including at least one selected from the group consisting of acetate, acetylacetonate, methylacetoacetate, ethylacetoacetate, octylene glycolate, butoxyacetylacetonate, lactate, lactate ammonium salt, and triethanol aminate as a ligand is preferable.

As the metal complex, various metal complexes are commercially available, and a commercially available metal complex may be used in the present disclosure. Further, various organic ligands, particularly various multidentate ligands that are capable of forming metal chelate catalysts are commercially available. Accordingly, a metal complex prepared by combining a commercially available organic ligand with a metal may be used.

The content of the aggregating agent is not particularly limited.

From the viewpoint of the aggregation rate of the ink, the content of the aggregating agent is preferably in a range of 0.1% by mass to 40% by mass, more preferably in a range of 0.1% by mass to 30% by mass, still more preferably in a range of 1% by mass to 20% by mass, even still more preferably in a range of 1% by mass to 10% by mass, and particularly preferably in a range of 2% by mass to 8% by mass with respect to the total amount of the pretreatment liquid.

(Resin)

It is preferable that the pretreatment liquid contains at least one resin.

In a case where the pretreatment liquid contains a resin, the adhesiveness of the image is further improved.

In the case where the pretreatment liquid contains a resin, the glass transition temperature (Tg) of the resin contained in the pretreatment liquid is preferably 0° C. or higher, more preferably 10° C. or higher, still more preferably 20° C. or higher, and even still more preferably 30° C. or higher.

In the case where the pretreatment liquid contains a resin, the glass transition temperature (Tg) of the resin contained in the pretreatment liquid is preferably 120° C. or lower, more preferably 100° C. or lower, still more preferably 80° C. or lower, and even still more preferably 70° C. or lower.

In the present disclosure, the glass transition temperature of the resin indicates a value measured using differential scanning calorimetry (DSC).

Specifically, the glass transition temperature is measured in conformity with the method described in JIS K 7121 (1987) or JIS K 6240 (2011).

The glass transition temperature in the present disclosure is an extrapolated glass transition start temperature (hereinafter, also referred to as Tig).

The method of measuring the glass transition temperature will be described in more detail.

In a case where the glass transition temperature is acquired, the resin is maintained at a temperature lower than the expected glass transition temperature of the resin by approximately 50° C. until the device is stabilized, the resin is heated to a temperature higher than the temperature at which the glass transition is completed by approximately 30° C. at a heating rate of 20° C./min, and a differential thermal analysis (DTA) curve or a DSC curve is created.

The extrapolated glass transition start temperature (Tig), that is, the glass transition temperature in the present disclosure is acquired as the temperature of the intersection between a straight line obtained by extending the base line on a low temperature side in the DTA curve or the DSC curve onto a high temperature side and a tangent drawn at a point where the gradient of a curve from a step-like change portion of the glass transition is maximized.

Further, in a case where the pretreatment liquid contains two or more kinds of resins, the glass transition temperature (Tg) of the resins in the pretreatment liquid indicates the weighted average value of the glass transition temperatures of the respective resins.

Examples of the resin that may be contained in the pretreatment liquid include an acrylic resin, a polyester resin, a polyolefin resin, a polyurethane resin, a polyurea resin, a polyamide resin, a polycarbonate resin, and a polystyrene resin.

The resins that can be contained in the pretreatment liquid include preferably a polyester resin or an acrylic resin and more preferably a polyester resin.

The resin that can be contained in the pretreatment liquid may be a water-soluble resin or a water-insoluble resin, but a water-insoluble resin is preferable.

It is preferable that the pretreatment liquid contains resin particles.

It is preferable that the resin particles consist of a water-insoluble resin.

Further, acrylic resin particles, polyester resin particles, a kneaded material of acrylic resin particles and polyester resin particles, or composite particles containing an acrylic resin and a polyester resin are preferable as the resin particles.

The weight-average molecular weight (Mw) of the resin in the resin particles is preferably in a range of 1000 to 300000, more preferably in a range of 2000 to 200000, and still more preferably in a range of 5000 to 100000.

The volume average particle diameter of the resin particles is preferably in a range of 1 nm to 300 nm, more preferably in a range of 3 nm to 200 nm, and still more preferably in a range of 5 nm to 150 nm.

In the present disclosure, the volume average particle diameter of the resin particles denotes a value measured by a particle size distribution measuring device (for example, MICROTRAC UPA (registered trademark) EX150, manufactured by NIKKISO CO., LTD.) using light scattering.

In a case of preparing the pretreatment liquid, a commercially available product of an aqueous dispersion liquid of resin particles may be used.

Examples of the commercially available product of an aqueous dispersion liquid of resin particles include PES-RESIN A124GP, PESRESIN A645GH, PESRESIN A615GE, and PESRESIN A520 (all manufactured by Takamatsu Oil & Fat Co., Ltd.), Eastek 1100 and Eastek 1200 (both manufactured by Eastman Chemical Company), PLASCOAT RZ570, PLASCOAT Z687, PLASCOAT Z565, PLASCOAT RZ570, and PLASCOAT Z690 (all manufactured by Goo Chemical Co., Ltd.), VYLONAL MD1200 (manufactured by Toyobo Co., Ltd.), and EM57DOC (manufactured by Daicel FineChem Ltd.).

In a case where the pretreatment liquid contains resin particles, the content of the resin particles is preferably in a range of 0.5% by mass to 30% by mass, more preferably in a range of 1% by mass to 20% by mass, and particularly preferably in a range of 1% by mass to 15% by mass with respect to the total amount of the pretreatment liquid.

(Water-Soluble Organic Solvent)

It is preferable that the pretreatment liquid contains at least one water-soluble organic solvent.

As the water-soluble organic solvent, known solvents can be used without particular limitation.

Examples of the water-soluble organic solvent include polyhydric alcohol such as glycerin, 1,2,6-hexanetriol, trimethylolpropane, alkanediol (for example, ethylene glycol, propylene glycol (1,2-propanediol), 1,3-propanediol, 1,3-butanediol, 1,4-butanediol, 2-butene-1,4-diol, 2-ethyl-1,3-hexanediol, 2-methyl-2,4-pentanediol, 1,2-octanediol, 1,2-hexanediol, 1,2-pentanediol, or 4-methyl-1,2-pentanediol), or polyalkylene glycol (for example, diethylene glycol, triethylene glycol, tetraethylene glycol, pentaethylene glycol, dipropylene glycol, or polyoxyethylene polyoxypropylene glycol); polyhydric alcohol ether such as polyalkylene glycol ether (for example, diethylene glycol monoalkyl ether, triethylene glycol monoalkyl ether, tripropylene glycol monoalkyl ether, or polyoxypropylene glyceryl ether); and alkyl alcohols having 1 to 4 carbon atoms, glycol ethers, 2-pyrrolidone, and N-methyl-2-pyrrolidone.

Among these, from the viewpoint of suppressing transfer of components, polyhydric alcohol or polyhydric alcohol ether is preferable, and alkanediol, polyalkylene glycol, or polyalkylene glycol ether is more preferable.

In a case where the pretreatment liquid contains a water-soluble organic solvent, the content of the water-soluble organic solvent is preferably in a range of 0.5% by mass to 30% by mass, more preferably in a range of 1% by mass to 20% by mass, and particularly preferably in a range of 1% by mass to 15% by mass with respect to the total amount of the pretreatment liquid.

As the water-soluble organic solvent that can be contained in the pretreatment liquid, a water-soluble organic solvent having a boiling point of lower than 220° C. is also preferable.

From the viewpoint of the drying properties of the pretreatment liquid, it is preferable that the pretreatment liquid does not contain an organic solvent having a boiling point of 220° C. or higher or the content of the organic solvent having a boiling point of 220° C. or higher is 5% by mass or less (more preferably 3 mass % or less, still more preferably 1 mass % or less) with respect to the total amount of the pretreatment liquid.

As specific examples of each of the water-soluble organic solvent having a boiling point of less than 220° C. and the organic solvent having a boiling point of 220° C. or higher, the section of "step of preparing first ink" described below can be referred to.

(Other Components)

The pretreatment liquid may contain other components in addition to the above-described components as necessary.

Examples of other components that may be contained in the pretreatment liquid include known additives such as a surfactant, a solid wetting agent, a silicic acid compound (such as colloidal silica), an inorganic salt, a fading inhibitor, an emulsion stabilizer, a penetration enhancer, an ultraviolet absorbing agent, a preservative, a fungicide, a pH adjuster, a viscosity adjuster, a rust inhibitor, a chelating agent, and a water-soluble polymer compound other than a water-soluble cationic polymer (for example, water-soluble polymer compounds described in paragraphs 0026 to 0080 of JP2013-001854A).

As other components that can be contained in the pretreatment liquid, components that can be contained in the first ink, described below, can also be referred to.

(Physical Properties of Pretreatment Liquid)

From the viewpoint of the aggregation rate of the ink, the pH of the pretreatment liquid at 25° C. is preferably in a range of 0.1 to 3.5.

In a case where the pH of the pretreatment liquid is 0.1 or greater, the roughness of the resin base material is further decreased and the adhesiveness of the image area is further improved.

In a case where the pH of the pretreatment liquid is 3.5 or less, the aggregation rate is further improved, coalescence of dots (ink dots) caused by the ink on the surface of the resin base material is further suppressed, and the roughness of the image is further decreased.

The pH of the pretreatment liquid at 25° C. is more preferably in a range of 0.2 to 2.0.

In the case where the pretreatment liquid contains an aggregating agent, from the viewpoint of the aggregation rate of the ink, the viscosity of the pretreatment liquid is preferably in a range of 0.5 mPa s to 10 mPa s and more preferably in a range of 1 mPa s to 5 mPa s.

The surface tension of the pretreatment liquid is preferably 60 mN/m or less, more preferably in a range of 20 mN/m to 50 mN/m, and still more preferably in a range of 30 mN/m to 45 mN/m.

Second Embodiment

An ink set according to a second embodiment of the present disclosure includes the ink of the present disclosure described above and a pretreatment liquid containing water and an aggregating agent.

The ink set of the second embodiment includes the pretreatment liquid, but is not limited to including the colored ink. The ink set of the second embodiment is different from the ink set of the first embodiment in this term.

Other than this term, the second embodiment is the same as the first embodiment, and the preferable aspects of the second embodiment (for example, preferable aspects for each of the ink and the pretreatment liquid) are also the same as the preferable aspects of the first embodiment.

Similar to the ink set of the first embodiment, the ink set of the second embodiment also includes the ink of the present disclosure described above, and thus the same effect as the effect of the ink of the present disclosure are exhibited.

[Image Recording Method]

An image recording method of the present disclosure includes an ink applying step of applying the ink of the present disclosure onto a base material by an ink jet method.

The image recording method of the present disclosure may include other steps as necessary.

Since the image recording method of the present disclosure is performed by using the ink of the present disclosure described above, the same effect as the effects of the ink of the present disclosure are exhibited according to the image recording method of the present disclosure.

<Ink Applying Step>

The ink applying step is a step of applying the ink of the present disclosure onto a base material by an ink jet method.

An image can be recorded with the ink of the present disclosure in the present step.

(Base Material)

The base material is not particularly limited, and a known base material can be used.

Examples of the base material include a paper base material, a paper base material on which a resin (such as polyethylene, polypropylene, or polystyrene) is laminated, a resin base material, a metal plate (such as a plate made of a metal such as aluminum, zinc, or copper), a paper base material on which the above-described metal is laminated or vapor-deposited, and a resin base material on which the above-described metal is laminated or vapor-deposited.

Further, examples of the base material also include a textile base material.

Examples of the material of the textile base material include natural fibers such as cotton, silk, hemp, and wool; chemical fibers such as viscose rayon and lyocell; synthetic fibers such as polyester, polyamide, and acryl; and a mixture of at least two selected from the group consisting of natural fibers, chemical fibers, and synthetic fibers. As the textile base material, the textile base material described in paragraphs [0039] to [0042] of WO2015/158592A may be used.

As the base material, an impermeable base material is preferable.

Here, the impermeable base material denotes a base material having a water absorption rate (% by mass, 24 hr.) of less than 0.2 in conformity with ASTMD 570 of the ASTM test method.

The impermeable base material is not particularly limited, but a resin base material is preferable.

The resin base material is not particularly limited, and examples thereof include a thermoplastic resin base material.

Examples of the resin base material include a base material obtained by molding a thermoplastic resin in the form of a sheet or film.

As the resin base material, a base material containing polypropylene, polyethylene terephthalate, nylon, polyethylene, or polyimide is preferable.

The resin base material may be a transparent resin base material.

Here, the term "transparent" indicates that the transmittance of visible light having a wavelength of 400 nm to 700 nm is 80% or greater (preferably 90% or greater).

The transparent resin base material is suitable in the above-described aspect in which an image is visually recognized through the base material from the surface side of the base material where an image is not recorded.

The shape of the resin base material is not particularly limited, but a sheet-shaped resin base material is preferable and a sheet-shaped resin base material which is capable of forming a roll by being wound is more preferable.

The thickness of the resin base material is preferably in a range of 10 μm to 200 μm and more preferably in a range of 10 μm to 100 μm.

The resin base material may be subjected to a surface treatment from the viewpoint of improving the surface energy.

Examples of the surface treatment include a corona treatment, a plasma treatment, a heat treatment, an abrasion treatment, a light irradiation treatment (UV treatment), and a flame treatment, but the surface treatment is not limited thereto.

(Ink Jet Head)

In the present step, the ink of the present disclosure is applied on a base material by an ink jet method.

That is, the ink of the present disclosure is jetted from the ink jet head and applied onto a base material.

The resolution of the ink jet head is preferably 300 dpi or greater, more preferably 600 dpi, and still more preferably 800 dpi.

Here, dpi stands for dot per inch, and 1 inch is 2.54 cm.

As the method of allowing the ink to be jetted from the ink jet head, for example, an electric charge control method of allowing an ink to be jetted using an electrostatic attraction force; a drop-on-demand method (pressure pulse method) using a vibration pressure of a piezoelectric element; an acoustic ink jet method of allowing an ink to be jetted using a radiation pressure by converting an electric signal into an acoustic beam and irradiating the ink with the acoustic beam; and a thermal ink jet (bubble jet (registered trademark)) method of heating an ink to form bubbles and utilizing the generated pressure can be used.

Further, as the method of allowing the ink to be jetted from the ink jet head, for example, a method described in JP1979-59936A (JP-S54-59936A), in which an ink is jetted from a nozzle using an action force caused by a rapid change in volume of the ink after being subjected to an action of thermal energy can also be used.

Further, as the method of allowing the ink to be jetted from the ink jet head, a method described in paragraphs 0093 to 0105 of JP2003-306623A can also be used.

An ink jet head in which at least a part of the portion where the ink comes into contact with the ink jet head (for example, a nozzle plate or an ink flow path) contains silicon is suitable as the ink jet head.

In this aspect, even in a case where at least a part of the portion where the ink comes into contact with the ink jet head is dissolved in the ink, the effect of suppressing dissolution deterioration of the ink jet head using the specific silicon compound (that is, the repair effect using the specific silicon compound) is more effectively exhibited.

Examples of the nozzle plate include a silicon nozzle plate having a plurality of jetting holes. The nozzle plate may include a silicon oxide film.

In regard to such an ink jet head, for example, known documents such as JP5430316B can be referred to.

For example, an ink jet head having a plurality of jetting holes and having a jetting surface (for example, a jetting surface of the nozzle plate) on which a liquid-repellent film is provided can be used as the ink jet head.

The liquid-repellent film in the ink jet head contains preferably a fluorine compound, more preferably a compound containing an alkyl fluoride group, and still more preferably perfluoroalkyl ether.

The thickness of the liquid-repellent film is not particularly limited, but is preferably in a range of 0.2 nm to 30 nm and more preferably in a range of 0.4 nm to 20 nm.

A commercially available product may be used as the ink jet head.

Examples of the commercially available product include an ink jet head "KM1800i" (manufactured by Konica Minolta, Inc.), an ink jet head "KJ4A-AA" (manufactured by Kyocera Corporation), and an ink jet head "Samba G3L" (manufactured by FUJIFILM Dimatix, Inc.).

From the viewpoint of obtaining an image with an excellent covering property, the liquid droplet amount of the ink jetted from the jetting hole of the ink jet head is preferably 1.0 pL (picoliter) or greater.

The liquid droplet amount of the ink is more preferably 1.5 pL or greater.

The upper limit of the liquid droplet amount of the ink is preferably 10 pL and more preferably 6 pL.

In the ink jet head, the diameter of the jetting hole from which the ink is jetted (that is, the nozzle diameter) is preferably 20 μm or less and more preferably 18 μm or less.

The lower limit of the diameter of the jetting hole is not particularly limited, and the lower limit thereof may be set to 10 μm, 11 μm, 12 μm, or the like.

The resolution of the ink jet head is preferably 300 dpi or greater, more preferably 600 dpi, and still more preferably 800 dpi.

Here, dpi stands for dot per inch, and 1 inch is 2.54 cm.

—Ink Applying Method—

The ink applying method may be any of a single pass method or a scanning method, but the single pass method is preferable from the viewpoint of the image recording speed.

Here, the single pass method is a method of fixing and disposing a line head, using a line head in which jetting holes (nozzles) corresponding to the entire region on one side of the base material are aligned as an ink jet head, and applying the ink onto the base material during the transport of the base material in a direction intersecting the direction in which the jetting holes of the line head are aligned.

Meanwhile, the scanning method is a method of allowing a short serial head on the base material to apply the ink using a short serial head as the ink jet head.

In the ink applying step, an image may be obtained by heating and drying the ink which has been applied onto the base material.

Examples of the means for heating and drying the ink include known heating means such as a heater, known air blowing means such as a dryer, and means for combining these.

Examples of the method for heating and drying the ink include a method of applying heat using a heater or the like from a side of the base material opposite to the surface onto which the ink has been applied; a method of applying warm air or hot air to the surface of the base material onto which the ink has been applied; a method of applying heat using an infrared heater from the surface of the base material onto which the ink has been applied or from a side of the base material opposite to the surface onto which the ink has been applied; and a method of combining a plurality of these methods.

The heating temperature of heating and drying the ink is preferably 55° C. or higher, more preferably 60° C. or higher, and particularly preferably 65° C. or higher. The upper limit of the heating temperature is not particularly limited, and the upper limit thereof may be 100° C. and preferably 90° C.

The time of heating and drying the ink is not particularly limited, but is preferably in a range of 3 seconds to 60 seconds, more preferably in a range of 5 seconds to 60 seconds, and particularly preferably in a range of 10 seconds to 45 seconds.

Further, the base material may be heated in advance before the application of the ink.

The heating temperature may be appropriately set, but the temperature of the base material is set to be preferably in a range of 20° C. to 50° C. and more preferably in a range of 25° C. to 40° C.

<Other Steps>

The image recording method of the present disclosure may include other steps in addition to the ink applying step.

Examples of the other steps include a pretreatment liquid applying step of applying a pretreatment liquid containing an aggregating agent and water onto a base material, which is a step provided before the ink applying step.

In a case where the image recording method of the present disclosure includes the pretreatment liquid applying step, the ink is applied onto a region of the base material where the pretreatment liquid has been applied, in the ink applying step. That is, it is preferable that the image recording method includes the pretreatment liquid applying step and the ink applying step in this order. Here, the pretreatment liquid applying step is a step of applying the pretreatment liquid that contains water and an aggregating agent onto the impermeable base material, and it is also preferable that the ink applying step is a step of applying the ink jet ink onto a region where the pretreatment liquid has been applied on the impermeable base material where the pretreatment liquid has been applied.

The pretreatment liquid is as described in the section of the ink set described above.

In regard to the pretreatment liquid applying step and the pretreatment liquid, for example, known documents such as WO2019/004485A and WO2019/163581A can be appropriately referred to.

The aggregating agent contained in the pretreatment liquid is preferably at least one selected from the group consisting of a polyvalent metal compound, an organic acid, a metal complex, and a cationic polymer and more preferably contains an organic acid.

The application of the pretreatment liquid in the pretreatment liquid applying step can be performed by employing a known application method such as a coating method, an ink jet recording method, or a dipping method.

Examples of the coating method include known coating methods using a bar coater, an extrusion die coater, an air doctor coater, a blade coater, a rod coater, a knife coater, a squeeze coater, and a reverse roll coater.

In the pretreatment liquid applying step, the pretreatment liquid applied onto the base material may be heated and dried.

The preferable methods and the preferable conditions for heating and drying are the same as the preferable methods and the preferable conditions for heating and drying the ink that can be carried out in the ink applying step.

<Colored Ink Applying Step and White Ink Applying Step>

The image recording method of the present disclosure may be performed by using the ink set of the present disclosure described above (that is, the ink set of the first embodiment or the second embodiment).

It is preferable that the image recording method in a case of using the ink set according to the first embodiment includes a colored ink applying step of jetting the colored ink from the ink jet head and applying the colored ink onto the impermeable base material and a white ink applying step of jetting the white ink from the ink jet head and applying the white ink onto a region where the colored ink has been applied on the impermeable base material where the colored ink has been applied.

According to the image recording method of this aspect, an image recorded material having a multicolor image A in which a color pattern image (such as a character or a FIGURE) recorded with a colored ink and a solid image-like white image recorded to cover the pattern image with a white ink are disposed on a base material in this order is easily produced.

It is preferable that the image recording method of the above-described aspect further includes a pretreatment liquid applying step of applying the above-described pretreatment liquid onto the impermeable base material before the colored ink applying step.

In this manner, an image with more excellent definition can be recorded.

According to the image recording method of such a preferable aspect, the above-described effect of limiting the ratio of X1/X2 ratio to 5.0 or less and the effect obtained by allowing the first silicon compound to contain a silicate and allowing the second silicon compound to contain colloidal silica are particularly effectively exhibited.

EXAMPLES

Hereinafter, examples of the present disclosure will be described below, but the present disclosure is not limited to the following examples.

In the description below, "water" indicates ion exchange water unless otherwise specified.

Example 1

<<Preparation of White Ink>>

A white ink W1 was prepared. Hereinafter, the details will be described.

<Synthesis of Uncrosslinked Polymer Dispersant N1>

965 g of dipropylene glycol was added to a 5000 mL three-neck flask provided with a stirrer and a cooling pipe and heated to 85° C. in a nitrogen atmosphere.

A solution I obtained by dissolving 640 g of benzyl methacrylate, 340 g of methacrylic acid, and 19.94 g of 2-mercaptopropionic acid in 370.28 g of dipropylene glycol and a solution II obtained by dissolving 17.69 g of t-butyl peroxy-2-ethylhexanoate (product name, "PERBUTYL 0", manufactured by NOF Corporation) in 221.17 g of dipropylene glycol were respectively prepared.

The solution I was added dropwise to the three-neck flask for 4 hours, and the solution II was added dropwise thereto for 5 hours. After completion of the dropwise addition, the solution was allowed to further react for 2 hours. The disappearance of the monomers was confirmed by $^1$H-NMR. The obtained reaction solution was heated to 70° C., 248.02 g of a 50 mass % potassium hydroxide aqueous solution was added thereto, 107.48 g of dipropylene glycol and 75.52 g of pure water were added thereto, and the solution was stirred, thereby obtaining a 37 mass % solution of a random polymer. This random polymer was defined as an uncrosslinked polymer dispersant N1.

The structural units constituting the obtained random polymer (that is, the uncrosslinked polymer dispersant N1) were confirmed by $^1$H-NMR. In addition, the weight-average molecular weight (Mw) was determined by GPC. The weight-average molecular weight (Mw) of the obtained uncrosslinked polymer dispersant N1 was 8400, and the acid value thereof was 221.7 mgKOH/g.

<Preparation of White Pigment Dispersion Liquid N Formed of Uncrosslinked Polymer Dispersant N1>

The uncrosslinked polymer dispersant N1 (150 parts by mass) was dissolved in water to prepare a polymer solution in which the concentration of the uncrosslinked polymer dispersant N1 was 25% by mass.

96 parts by mass of the polymer solution, 300 parts by mass of C.I. Pigment White 6 (trade name, "JR-405", manufactured by Tayca Corporation, titanium dioxide particles) as a white pigment, and 270 parts by mass of water were mixed to obtain a mixed solution. A potassium hydroxide aqueous solution was added to the obtained mixed solution, and the pH after neutralization was adjusted to 8.7. Further, the pH is a value measured at 25° C. using a pH meter (model name: WM-50EG, manufactured by DDK-Toa Corporation). Next, the mixed solution after neutralization was subjected to a dispersion treatment for 3 hours using a bead mill (bead diameter: 0.1 mmφ, zirconia beads). In this manner, a white pigment dispersion liquid N (uncrosslinked dispersion liquid) in which the white pigment was dispersed by the uncrosslinked polymer dispersant N1 was obtained. The pigment concentration of the uncrosslinked dispersion liquid was 45% by mass, and the concentration of the uncrosslinked polymer dispersant N1 was 3.6% by mass.

<Preparation of White Pigment Dispersion Liquid CL Formed of Crosslinked Polymer Dispersant L1>

2.70 parts by mass of trimethylolpropane polyglycidyl ether (product name, "Denacol EX-321", manufactured by Nagase ChemteX Corporation) as a crosslinking agent and 29.5 parts by mass of a boric acid aqueous solution (concentration of boric acid: 4% by mass) were added to 136 parts by mass of the white pigment dispersion liquid N (uncrosslinked dispersion liquid) in which the white pigment was dispersed by the uncrosslinked polymer dispersant N1, and the mixture was allowed to react at 70° C. for 6 hours and cooled to 25° C. In this manner, the uncrosslinked polymer dispersant N1 in the dispersion liquid was crosslinked to form a crosslinked polymer dispersant L1, thereby obtaining a white pigment dispersion liquid (crosslinked dispersion liquid) in which the white pigment was dispersed by the crosslinked polymer dispersant L1.

Ion exchange water was added to the obtained crosslinked dispersion liquid such that the concentration of the pigment was set to 15% by mass. Ultrafiltration was performed by allowing the crosslinked dispersion liquid to which ion exchange water had been added to flow into an ultrafiltration device (cross-flow type ultrafilter (UF), manufactured by Sartorius AG) provided with a polyether sulfone (PESU) film (size of micropores: 0.1 μm) at a flow rate of 600 mL for 1 minute. At this time, the liquid temperature was adjusted to 25° C., and the ultrafiltration was performed 8 times by setting 1 time of the volume magnification of the charged liquid as 1 time. Next, ion exchange water was added such that the concentration of the white pigment was set to 45% by mass. In this manner, a white pigment dispersion liquid CL was obtained. The acid value of the crosslinked polymer dispersant L1 contained in the white pigment dispersion liquid CL was 105 mgKOH/g. Further, the concentration of the crosslinked polymer dispersant L1 was 3.6% by mass.

The crosslinked polymer dispersant L1 was a crosslinked polymer in which the uncrosslinked polymer dispersant N1 was crosslinked with polyethylene glycol diglycidyl ether serving as a crosslinking agent.

The white ink described below was prepared by using the white pigment dispersion liquid CL containing the crosslinked polymer dispersant L1.

<Preparation of Dispersion Liquid of Resin Particles P1>

A dispersion liquid of resin particles P1 serving as one of the components in the ink was prepared. Hereinafter, the details will be described.

A 2 L three-neck flask (reaction container) provided with a stirrer, a thermometer, a reflux condenser, and a nitrogen gas introduction pipe was charged with 560.0 g of methyl ethyl ketone, and the solution was heated to 87° C. Next, a mixed solution consisting of 220.4 g of methyl methacrylate, 301.6 g of isobornyl methacrylate, 58.0 g of methacrylic acid, 108 g of methyl ethyl ketone, and 2.32 g of "V-601" (polymerization initiator, manufactured by Fujifilm Wako Pure Chemical Corporation, dimethyl 2,2'-azobis(2-methyl propionate)) was added dropwise to the methyl ethyl ketone in the reaction container at a constant rate such that the dropwise addition was completed for 2 hours while the reflux state in the reaction container was maintained (hereinafter, the reflux state was maintained until the reaction was completed). After completion of the dropwise addition, the solution was stirred for 1 hour, and the operation of the following step (1) was performed on the solution after being stirred for 1 hour.

Step (1): A solution consisting of 1.16 g of "V-601" and 6.4 g of methyl ethyl ketone was added to the solution, and the resulting solution was stirred for 2 hours.

Next, the operation of the step (1) was repeatedly performed four times, a solution formed of 1.16 g of "V-601" and 6.4 g of methyl ethyl ketone was added to the solution, and the resulting solution was stirred for 3 hours (the operation carried out so far is referred to as the "reaction").

After completion of the reaction, the temperature of the solution was lowered to 65° C., 163.0 g of isopropanol was added thereto, and the solution was allowed to be naturally cooled, thereby obtaining a polymerization solution containing a copolymer (concentration of solid contents of 41.0% by mass).

Next, 317.3 g of the obtained polymerization solution was weighed, 46.4 g of isopropanol, 1.65 g of a 20 mass % maleic acid anhydride aqueous solution (water-soluble acidic compound, corresponding to 0.3% by mass as maleic acid with respect to the copolymer), and 40.77 g of a 2 mol/L sodium hydroxide (NaOH) aqueous solution were added to the solution, and the temperature of the liquid in the reaction container was increased to 70° C.

Next, 380 g of distilled water was added dropwise to the liquid which had been heated to 70° C., at a speed of 10 mL/min, to carry out dispersion in water (dispersion step).

Thereafter, a total amount of 287.0 g of isopropanol, methyl ethyl ketone, and distilled water was distilled off by maintaining the temperature of the liquid in the reaction container at 70° C. for 1.5 hours under reduced pressure (solvent removal step). 0.278 g (440 ppm by mass as benzisothiazolin-3-one with respect to solid content of polymer) of PROXEL GXL (S) (manufactured by Arch Chemicals, Inc.) was added to the obtained liquid.

The obtained liquid was filtered through a filter with a pore size of 1 μm, and the filtrate was collected, thereby obtaining an aqueous dispersion liquid (nonvolatile content concentration of 23.2% by mass) of the resin particles P1 formed of a copolymer of methyl methacrylate, isobornyl methacrylate, methacrylic acid, and sodium methacrylate at a mass ratio of 70/20/5/5. The volume average particle diameter of the resin particles P1 was 5.0 nm, and the weight-average molecular weight (Mw) of the resin particles P1 was 60000.

<Preparation of White Ink W1>

A white ink W1 having the following composition was prepared by using the white pigment dispersion liquid CL containing the crosslinked polymer dispersant L1, the dispersion liquid of the resin particles P1, and the materials in the following composition.

In the columns of "dispersion method" in Tables 1 and 2, "crosslinking" denotes that the white pigment dispersion liquid CL containing the crosslinked polymer dispersant L1 was used for the preparation of the white ink.

—Composition of White Ink W1—

Titanium dioxide particles 1: 12% by mass

Crosslinked polymer dispersant L1: 0.96% by mass

Colloidal silica as silicon compound ("SNOWTEX XS", manufactured by Nissan Chemical Corporation): 0.05% by mass as amount of solid content Propylene glycol (PG) (water-soluble organic solvent): 25% by mass Resin particles P1: 5.0% by mass OLEFINE E1010 (manufactured by Nissin Chemical Co., Ltd., acetylene glycol-based surfactant): 0.5% by mass Water: remaining amount set such that total amount of composition was 100% by mass <<Preparation of Pretreatment Liquid>>

The components in the following composition were mixed to obtain a pretreatment liquid.

—Composition of Pretreatment Liquid—

Malonic acid (manufactured by FUJIFILM Wako Pure Chemical Corporation; aggregating agent (organic acid)): 5.0% by mass Sodium dodecyl benzene sulfonate (surfactant), (manufactured by Tokyo Chemical Industry Co., Ltd.): 1.0% by mass Water: remaining amount set such that total amount of composition was 100% by mass <<Image Recording>>

Image recording was performed in the following manner using the ink described above and a biaxially oriented polypropylene (OPP) film as a base material (thickness of 40 μm, surface treatment: corona discharge treatment, manufactured by Futamura Chemical Co., Ltd.) (impermeable base material).

(1) Recording Method

The ink was applied onto the surface of the base material, on which the corona discharge treatment had been performed, in the form of a solid image, by jetting the ink from the ink jet head using an ink jet recording device including a transport system for transporting the base material and the following ink jet head. The ink applied onto the base material was dried at 80° C. for 30 seconds to obtain a solid image which was a white image. The ink was dried by placing the base material, to which the ink had been applied, on a hot plate.

As described above, an image recorded material including a base material and a solid image disposed on the base material was obtained.

(2) Recording Conditions

Ink jet head: ink jet head "Samba G3L" (manufactured by FUJIFILM Dimatix, Inc.), which is 1200 dpi×1200 dpi piezo head (width of 42.69 mm)

Liquid droplet amount of ink: 1.8 pL

Driving frequency: 30 kHz (transportation speed of base material: 635 mm/sec)

Ink applying method: single pass method

<<Measurement and Evaluation>>

The following measurement and evaluation were performed.

The results are listed in Table 1.

<Dissolution Deterioration of IJ Head>

A liquid-repellent film (self-assembled monolayer (SAM) film) was formed on a silicon base material with a size of 2 cm×2 cm by using an alkylsilane fluoride compound, thereby obtaining a test piece for evaluation of an ink jet head (hereinafter, also referred to as "IJ head").

The white ink W1 (30 mL) prepared above was poured into a 50 mL wide-mouth bottle made of polypropylene (Iboy wide-mouth bottle with a volume of 50 mL (manufactured by AS ONE Corporation)), and the test piece was immersed therein and aged at an ink temperature of 60° C. for 72 hours.

The test piece was taken out from the white ink W1 after the aging and washed with ultrapure water, and the water contact angle of the surface of the washed test piece on the liquid-repellent film side was measured. The water contact angle was measured by a known method using a contact angle measuring device (DM-500, manufactured by Kyowa Interface Science Co., Ltd.) and ultrapure water in an environment of 25° C. and 50 RH %.

Based on the measurement result of the water contact angle, the dissolution deterioration of the IJ head was evaluated according to the following evaluation standards.

Here, the water contact angle of the surface of the test piece before being immersed in the white ink W1 on the liquid-repellent film side was 80° or greater.

In the following evaluation standards, the rank of the most suppressed dissolution deterioration in the ink jet head is AA.

—Evaluation Standards for Dissolution Deterioration of IJ Head—

AA: The water contact angle was 80° or greater.

A: The water contact angle was 60° or greater and less than 80°.

B: The water contact angle was 40° or greater and less than 60°.

C: The water contact angle was 20° or greater and less than 40°.

D: The water contact angle was less than 20°.

<Abrasion Deterioration of IJ Head>

A test piece used to evaluate the IJ head, which was the same as the test piece used to evaluate the dissolution deterioration of the IJ head, was prepared.

Diethylene glycol monobutyl ether (20 parts by mass), diethylene glycol (10 parts by mass), and water (70 parts by mass) were mixed to obtain a washing solution 1. The obtained washing solution 1 (97 parts by mass) and the white ink W1 (3 parts by mass) were mixed to obtain a diluted ink.

A cloth (TORAYSEE, manufactured by Toray Industries, Inc.) was wound around a rubber roller provided with a rotation mechanism and having a diameter of 40 mm, and the diluted ink was made to infiltrate into the wound cloth. A rubbing operation of rubbing the surface of the test piece on the liquid-repellent film side with the cloth into which the diluted ink was infiltrated was performed by rotating the roller in the above-described state.

The rubbing operation (that is, the rotation of the roller) was appropriately stopped, and the water contact angle of the surface of the test piece on the liquid-repellent film side was measured. The measurement of the water contact angle was performed in the same manner as the measurement of the water contact angle in the evaluation of the dissolution deterioration of the IJ head.

The rubbing operation and the measurement of the water contact angle were repeated, and the number of times that the roller was made to rotate at a water contact angle of less than 60° was determined.

The abrasion deterioration of the IJ head was evaluated according to the following evaluation standards based on the number of times that the roller was made to rotate at a water contact angle of less than 60°.

In the following evaluation standards, the rank of the most suppressed abrasion deterioration in the ink jet head is A.

—Evaluation Standards for Abrasion Deterioration of IJ Head—

A: The number of times that the roller was made to rotate at a water contact angle of less than 60° was 1500 times or more.

B: The number of times that the roller was made to rotate at a water contact angle of less than 60° was 1000 times or more and less than 1500 times.

C: The number of times that the roller was made to rotate at a water contact angle of less than 60° was 800 times or more and less than 1000 times.

D: The number of times that the roller was made to rotate at a water contact angle of less than 60° was less than 800 times.

<Covering Property>

The covering property of the solid image in the image recorded material was evaluated in the following manner.

Character images (four in total) with sizes of 2 pt (point), 4 pt, 6 pt, and 8 pt were recorded on the base material separately from the image recorded material using a black ink jet ink ("C-WP-QK", manufactured by FUJIFILM Corporation), thereby obtaining a base material with black character images. The four character images were all character images illustrated in FIG. 1.

The image recorded material and the base material with character images were overlapped with each other in an orientation in which non-image recorded surfaces (surfaces where the images were not recorded) were in contact to obtain a laminate. The obtained laminate was exposed to a 30 W fluorescent lamp such that the solid image faced the side of the evaluator, the evaluator confirmed whether the details of each character image were visually recognizable through the solid image, and the covering property of the solid image was evaluated according to the following evaluation standards. Here, the distance between the eyes of the evaluator and the laminate was set to 20 cm, and the distance from the laminate to the fluorescent lamp was set to 2 m.

In the evaluation standards, the rank of the most excellent covering property of the solid image is "A".

—Evaluation Standards for Covering Property—

A: The details of the character images with sizes of 2 pt, 4 pt, 6 pt, and 8 pt were not visually recognizable.

B: The details of the character image with a size of 8 pt were visually recognizable, but the details of the character images with sizes of 2 pt, 4 pt, and 6 pt were not visually recognizable.

C: The details of the character images with sizes of 6 pt and 8 pt were visually recognizable, but the details of the character images with sizes of 2 pt and 4 pt were not visually recognizable.

D: The details of the character images with sizes of 4 pt, 6 pt, and 8 pt were visually recognizable, but the details of the character image with a size of 2 pt were not visually recognizable.

E: The details of the character images with sizes of 2 pt, 4 pt, 6 pt, and 8 pt were visually recognizable.

Examples 2 to 13 and Comparative Examples 1 to 5

The same operation as in Example 1 except that the particle diameter of titanium dioxide, the content (% by mass) of titanium dioxide with respect to the total amount of the white ink, the kind of the silicon compound, the particle diameter of colloidal silica in a case where the silicon compound was colloidal silica, the content (% by mass) of the silicon compound with respect to the total amount of the white ink, and the combination of the dispersion methods in the white ink were changed as listed in Tables 1 and 2.

The results are listed in Table 1 and Table 2.

The numbers of the white inks in each example and each comparative example are listed in Table 1 and Table 2.

In the columns of the dispersion method, "block" denotes that the following block polymer 1 was used as the polymer dispersant for dispersing the titanium dioxide particles.

The white pigment dispersion liquid was prepared in the following manner in a case where "block" is listed in the columns of the dispersion method.

<Synthesis of Polymer Dispersant (Block Polymer 1)>

A block polymer 1 serving as a polymer dispersant was synthesized with reference to Synthesis Example 8 of JP2015-83688A. The details are described below.

Diethylene glycol dimethyl ether (266 parts by mass; polymerization solvent), 2-iodo-2-cyanopropane (6.2 parts by mass; polymerization initiation compound), methyl methacrylate (MMA) (120 parts by mass; monomer), acrylic acid (AA) (28.8 parts by mass; monomer), cyclohexyl methacrylate (CHMA) (67.2 parts by mass; monomer), azobisdimethylisovaleronitrile (7.9 parts by mass), and 2-t-butyl-4,6-dimethylphenol (0.7 parts by mass; catalyst) were added to a reactor of a 1 L separable flask equipped with a stirrer, a backflow condenser, a thermometer, and a nitrogen introduction pipe, and the mixture was stirred while nitrogen was allowed to flow.

Next, the temperature (reaction temperature) of the mixture in the reactor was increased to 70° C., and the mixture was polymerized for 3 hours, thereby obtaining a polymerization solution A containing an MMA/AA/CHMA copolymer.

After 3 hours, as a result of sampling a part of the polymerization solution A and measuring the solid content, the solid content was 42.0% by mass, and thus it was confirmed that most of the monomers were polymerized.

Further, in a case where the molecular weight of the MMA/AA/CHMA copolymer was measured by GPC, the weight-average molecular weight (Mn) was 7,500.

The acid value of this MMA/AA/CHMA copolymer was 101.0 mgKOH/g.

Next, a mixture of benzyl methacrylate (BzMA) (35.2 parts by mass; monomer) and V-65 (0.3 parts by mass; radical generator) was added to the polymerization solution A described above, and the mixture was polymerized at 70° C. for 3 hours, thereby obtaining a polymerization solution B containing the block polymer 1 as a polymer dispersant.

Here, the block polymer 1 is a block polymer containing an A block which is an MMA/AA/CHMA copolymer and a B block which is a BzMA homopolymer.

As a result of measurement of the solid content in the obtained polymerization solution B, the solid content thereof was 43.2% by mass and it was confirmed that most of the monomers were polymerized.

Further, the Mw of the block polymer was 8,500, and the acid value thereof was 89.3 mgKOH/g.

<Preparation of White Pigment Dispersion Liquid ("Block")>

The block polymer 1 (136.4 parts by mass), butyl carbitol (163.6 parts by mass), and C.I. Pigment White 6 (trade name, "JR-405", manufactured by Tayca Corporation, titanium dioxide particles) (450 parts by mass) as a white pigment were blended with each other and stirred with a disper.

Next, the white pigment was sufficiently dispersed using a horizontal media disperser, thereby obtaining an oil-based pigment dispersion liquid. The average particle diameter of the white pigment dispersed in the oil-based pigment dispersion liquid was 290 nm. The viscosity of the oil-based pigment dispersion liquid was 86.3 mPa s.

Next, a mixed solution consisting of potassium hydroxide (4.0 parts by mass) and water (341 parts by mass) was gradually added to the oil-based pigment dispersion liquid (700 parts by mass) while being stirred using a disper, and the solution was neutralized. Thereafter, the white pigment was sufficiently dispersed using a horizontal media disperser, thereby obtaining a pigment dispersion liquid.

Next, ultrafiltration was performed by allowing ion exchange water to flow through the obtained pigment dispersion liquid at a flow rate of 600 mL per minute using an ultrafiltration device (cross-flow type ultrafilter (UF), manufactured by Sartorius AG). The liquid temperature was maintained at 25° C., and the ultrafiltration was performed eight times by setting one time the volume of the charged liquid to once. Ion exchange water was added thereto to obtain a white pigment dispersion liquid "block" in which the pigment concentration was 45% by mass and the concentration of the pigment dispersant block polymer was 3.6% by mass.

In the columns of the dispersion method, "random" denotes that the following random polymer 1 was used as the polymer dispersant for dispersing the titanium dioxide particles.

The white pigment dispersion liquid was prepared in the following manner in a case where "random" is listed in the columns of the dispersion method.

<Synthesis of Random Polymer 1 (Polymer Dispersant)>

A solution I obtained by mixing 234 g of benzyl methacrylate, 120 g of stearyl methacrylate, 84 g of methacrylic acid, 162 g of hydroxyethyl methacrylate, and 3.93 g of 2-mercaptopropionic acid and a solution II obtained by dissolving 6.2 g of t-butyl peroxy-2-ethylhexanoate (PERBUTYL 0, manufactured by NOF Corporation) in 115 g of dipropylene glycol were respectively prepared.

605 g of dipropylene glycol was added to a three-neck flask provided with a stirrer and a cooling pipe and heated to 85° C. in a nitrogen atmosphere. Here, the solution I and the solution II were added dropwise thereto respectively over 4 hours and 5 hours.

After the completion of the dropwise addition, the resulting solution was allowed to further react for 2 hours, heated to 95° C., and heated and stirred for 3 hours so that all unreacted monomers were allowed to react. The disappearance of the monomers was confirmed by $^{1}$H-NMR.

The obtained reaction solution was heated to 70° C., 74 g of dimethylaminoethanol was added thereto as an amine compound, and 764 g of propylene glycol was added thereto, and the resulting solution was stirred, thereby obtaining a solution (solid content: 30% by mass) of the random polymer 1 having a weight-average molecular weight (Mw) of 30000 and an acid value of 112 mgKOH/g.

The constituent components of the obtained polymer were confirmed by $^{1}$H-NMR.

<Preparation of White Pigment Dispersion Liquid ("Random")>

150 parts by mass of the random polymer 1 was dissolved in water, and the solution was prepared such that the pH after neutralization reached 9 and the concentration of the random polymer 1 reached approximately 25% by mass using a potassium hydroxide aqueous solution, thereby obtaining an aqueous solution of the random polymer 1.

Respective components were mixed as in the composition of the white pigment dispersion liquid described below, and the obtained mixed solution was subjected to a dispersion treatment for 1.5 hours using LABOSTAR Mini LMZ015 (manufactured by Ashizawa Finetech Ltd., bead diameter: 0.1 mmφ, zirconia beads, rotation speed: 10 m/sec), thereby obtaining a white pigment dispersion liquid (white pigment concentration of 48% by mass, solid content concentration of 50% by mass).

—Composition of White Pigment Dispersion Liquid—

Aqueous solution of random polymer 1: 54 parts by mass

White pigment (C.I. Pigment White 6 (trade name "JR-405", titanium dioxide particles, manufactured by Tayca Corporation)): 500 parts by mass Propylene glycol: 100 parts by mass Water: remaining amount set such that total amount of composition was 1000 parts by mass In the columns of the dispersion method, "self-dispersion" denotes that a white pigment dispersion liquid ("self-dispersion") of self-dispersing titanium dioxide particles was used as the white pigment dispersion liquid.

The white pigment dispersion liquid was prepared in the following manner in a case where "self-dispersion" is listed in the columns of the dispersion method.

<Preparation of White Pigment Dispersion Liquid ("Self-Dispersion")>

—White Pigment Dispersion Liquid (Self-Dispersion)—

100 g of titanium dioxide particles were added to 3,000 mL of a 2.5N sodium hypochlorite solution, and the mixture was stirred at a temperature of 60° C. and a speed of 300 rpm for 10 hours. A reaction solution of the white pigment in which a carboxy group was applied to the surface of titanium dioxide particles was obtained by performing an oxidation treatment. The obtained reaction solution was filtered, and the white pigment filtered by separation was neutralized with a sodium hydroxide solution, and ultrafiltration was performed. Next, ultrafiltration was performed with a dialysis membrane using ion exchange water, and ultrasonic dispersion was further performed using an ultrasonic disperser, thereby obtaining a white pigment dispersion liquid ("self-dispersion") having a pigment concentration of 45% by mass.

TABLE 1

| | | | Example 1 | Comparative Example 1 | Comparative Example 2 | Comparative Example 3 | Comparative Example 4 | Example 2 |
|---|---|---|---|---|---|---|---|---|
| White ink No. | | | W1 | W2 | W3 | W4 | W5 | W6 |
| White ink | Titanium dioxide particles | Particle diameter (nm) | 260 | 260 | 260 | 260 | 260 | 260 |
| | | Content (% by mass) | 12% | 12% | 12% | 12% | 12% | 12% |
| | Silicon compound | Type | SNOWTEX XS | None | Sodium silicate | SNOWTEX XS | SNOWTEX 30 | Sodium silicate |
| | | Particle diameter (nm) | 5 | — | — (Water-soluble) | 5 | 12 | — (Water-soluble) |
| | | Content (% by mass) (X1) | 0.05% | — | 0.0002% | 0.0002% | 0.05% | 0.0004% |

TABLE 1-continued

| | | | Crosslinking | Crosslinking | Crosslinking | Crosslinking | Crosslinking | Crosslinking |
|---|---|---|---|---|---|---|---|---|
| | Dispersion method | | Crosslinking | Crosslinking | Crosslinking | Crosslinking | Crosslinking | Crosslinking |
| | Ratio of particle diameter [colloidal silica/titanium dioxide particles] | | 0.02 | — | — | 0.02 | 0.05 | — |
| | Content of silicon compound with respect to total amount of titanium dioxide particles (% by mass) | | 0.42% | — | 0.0017% | 0.0017% | 0.42% | 0.0033% |
| Evaluation results | Dissolution deterioration of IJ head | | B | D | C | D | C | B |
| | Abrasion deterioration of IJ head | | B | C | C | C | C | B |
| | Covering property | | A | A | A | A | A | A |

| | | | | Example 3 | Example 4 | Example 5 | Example 6 |
|---|---|---|---|---|---|---|---|
| White ink No. | | | | W7 | W8 | W9 | W10 |
| White ink | Titanium dioxide particles | Particle diameter (nm) | | 260 | 260 | 260 | 260 |
| | | Content (% by mass) | | 12% | 12% | 12% | 12% |
| | Silicon compound | Type | | Sodium silicate | Sodium silicate | Sodium silicate | Sodium silicate |
| | | Particle diameter (nm) | | — (Water-soluble) | — (Water-soluble) | — (Water-soluble) | — (Water-soluble) |
| | | Content (% by mass) (X1) | | 0.001% | 0.005% | 0.05% | 0.23% |
| | Dispersion method | | | Crosslinking | Crosslinking | Crosslinking | Crosslinking |
| | Ratio of particle diameter [colloidal silica/titanium dioxide particles] | | | — | — | — | — |
| | Content of silicon compound with respect to total amount of titanium dioxide particles (% by mass) | | | 0.0083% | 0.042% | 0.42% | 1.9% |
| Evaluation results | Dissolution deterioration of IJ head | | | A | AA | A | B |
| | Abrasion deterioration of IJ head | | | B | A | A | A |
| | Covering property | | | A | A | A | A |

40

TABLE 2

| | | | Example 7 | Example 8 | Example 9 | Example 10 | Example 11 |
|---|---|---|---|---|---|---|---|
| White ink No. | | | W11 | W12 | W13 | W14 | W16 |
| White ink | Titanium dioxide particles | Particle diameter (nm) | 260 | 260 | 260 | 260 | 260 |
| | | Content (% by mass) | 12% | 12% | 12% | 12% | 12% |
| | Silicon compound | Type | Potassium silicate | Lithium silicate | Ammonium silicate | Sodium silicate | Sodium silicate |
| | | Particle diameter (nm) | — (Water-soluble) | — (Water-soluble) | — (Water-soluble) | — (Water-soluble) | — (Water-soluble) |
| | | Content (% by mass) (X1) | 0.005% | 0.005% | 0.005% | 0.005% | 0.005% |
| | Dispersion method | | Crosslinking | Crosslinking | Crosslinking | Block | Random |
| | Ratio of particle diameter [colloidal silica/titanium dioxide particles] | | — | — | — | — | — |
| | Content of silicon compound with respect to total amount of titanium dioxide particles (% by mass) | | 0.042% | 0.042% | 0.042% | 0.042% | 0.042% |
| Evaluation results | Dissolution deterioration of IJ head | | AA | AA | AA | AA | A |
| | Abrasion deterioration of IJ head | | A | A | A | A | B |
| | Covering property | | A | A | A | A | B |

TABLE 2-continued

|  |  |  | Example 12 | Example 13 | Comparative Example 5 |
|---|---|---|---|---|---|
| White ink No. |  |  | W17 | W18 | W19 |
| White ink | Titanium dioxide particles | Particle diameter (nm) | 260 | 120 | 80 |
|  |  | Content (% by mass) | 12% | 12% | 12% |
|  | Silicon compound | Type | Sodium silicate | Sodium silicate | Potassium silicate |
|  |  | Particle diameter (nm) | — (Water-soluble) | — (Water-soluble) | — (Water-soluble) |
|  |  | Content (% by mass) (X1) | 0.005% | 0.005% | 0.005% |
|  | Dispersion method |  | Self-dispersion | Self-dispersion | Crosslinking |
|  | Ratio of particle diameter [colloidal silica/titanium dioxide particles] |  | — | — | — |
|  | Content of silicon compound with respect to total amount of titanium dioxide particles (% by mass) |  | 0.042% | 0.042% | 0.042% |
| Evaluation results | Dissolution deterioration of IJ head |  | A | B | B |
|  | Abrasion deterioration of IJ head |  | B | B | C |
|  | Covering property |  | B | B | C |

As listed in Tables 1 and 2, in each example in which the ink containing water, titanium dioxide particles, and a silicon compound, in which the average primary particle diameter of the titanium dioxide particles was 100 nm or greater, the silicon compound was at least one selected from the group consisting of a silicate and colloidal silica, the content of the silicon compound was 0.0020% by mass or greater with respect to the total amount of the titanium dioxide particles, and the particle diameter ratio [colloidal silica/titanium dioxide particles] (that is, the ratio of the average primary particle diameter of the colloidal silica to the average primary particle diameter of the titanium dioxide particles) was 0.04 or less, was used, an image with an excellent covering property could be recorded and the abrasion deterioration of the IJ head could be was suppressed.

Further, in each of the examples, the dissolution deterioration of the IJ head could also be suppressed.

The results of each comparative example as compared to each example were as follows.

In Comparative Example 1 in which the ink did not contain a silicon compound, abrasion deterioration of the IJ head could not be suppressed.

Even in Comparative Examples 2 and 3 in which the content of the silicon compound was less than 0.0020% by mass with respect to the total amount of the titanium dioxide particles in the ink, the abrasion deterioration of the IJ head could not be suppressed.

In Comparative Example 4 in which the particle diameter ratio [colloidal silica/titanium dioxide particles] in the ink was greater than 0.04, the abrasion deterioration of the IJ head could not be suppressed.

In Comparative Example 5 in which the average primary particle diameter of the titanium dioxide particles in the ink was less than 100 nm, the covering property of the image was degraded, and the abrasion deterioration of the IJ head could not be suppressed.

As shown in the results of Examples 1, 4, 5, and 7 to 9, it was found that in a case where the silicon compound in the ink contains a silicate and the silicate is at least one selected from the group consisting of an alkali metal silicate and an ammonium silicate (Examples 4, 5, and 7 to 9), the abrasion deterioration of the IJ head can be further suppressed.

As shown in the results of Examples 7 to 13, it was found that in a case where the ink contains a polymer dispersant and the polymer dispersant contains a block polymer or a polymer having a crosslinked structure (Examples 7 to 10), the abrasion deterioration of the IJ head can be further suppressed. The reason for this is considered to be that the titanium dioxide particles can be densely coated with the polymer dispersant as compared with a case where the polymer dispersant is a random polymer, and thus polishing of the IJ head by the titanium dioxide particles can be further suppressed.

As shown in the results of Examples 3 to 6, it was found that in a case where the content of the silicon compound with respect to the total amount of the titanium dioxide particles is in a range of 0.040% by mass to 2.0% by mass (Examples 4 to 6), the abrasion deterioration of the IJ head can be further suppressed.

Examples 101 to 111

<Preparation of Ink Set>

Each ink set was prepared by combining each number of white ink listed in Table 3, the following colored ink (common), and the following pretreatment liquid (common).

Each number of white ink is the white ink used in Examples 1 to 10.

<Preparation of Colored Ink>

A colored ink (specifically, a cyan ink) having the following composition was prepared using the white pigment dispersion liquid CL containing the crosslinked polymer dispersant L1 described above, the dispersion liquid of the resin particles P1 described above, and the materials in the following compositions.

The kinds and the contents of silicon compounds in the following colored inks are listed in Table 3.

—Composition of Colored Ink—

Cyan pigment (C.I. Pigment Blue 15:3): 0.3% by mass

Crosslinked polymer dispersant L1: 1.4% by mass

Colloidal silica as silicon compound ("SNOWTEX XS", manufactured by Nissan Chemical Corporation): 0.05% by mass as amount of solid content Propylene glycol (PG) (water-soluble organic solvent): 25% by mass Resin particles P1: 5.0% by mass OLEFINE E1010 (manufactured by Nissin Chemical Co., Ltd., acetylene glycol-based surfactant): 1.0% by mass Water: remaining amount set such that total amount of composition was 100% by mass <Preparation of Pretreatment Liquid>

The components in the following composition were mixed to obtain a pretreatment liquid.

—Composition of Pretreatment Liquid—

Malonic acid (manufactured by FUJIFILM Wako Pure Chemical Corporation; aggregating agent (organic acid)): 5% by mass Sodium dodecyl benzene sulfonate (surfactant), (manufactured by Tokyo Chemical Industry Co., Ltd.): 1.0% by mass Water: remaining amount set such that total amount of composition was 100% by mass <<Image Recording>>

The image recording was performed in the following manner by using the above-described ink set and the same base material (impermeable base material) as the base material used in Example 1.

(1) Recording Method

The image recording was performed by using an ink jet recording device including a transport system for transporting a base material, a wire bar coater for applying the pretreatment liquid (coating amount: 1.5 g/m 2), and a plurality of IJ heads.

As the plurality of IJ heads, the same IJ head as the IJ head used in Example 1 was used. The plurality of IJ heads were disposed in a transport direction of the base material.

Specifically, first, the surface of the base material which had been subjected to a corona discharge treatment was coated with the pretreatment liquid while the base material was transported, and the pretreatment liquid was dried at 80° C. for 3 seconds.

Next, the colored ink (specifically, a cyan ink) was jetted from the IJ head on the upstream side in the transport direction of the base material onto a region of the base material coated with the pretreatment liquid, thereby obtaining a cyan character image. As the cyan character image here, the same character images as the four character images (that is, the character images with sizes of 2 pt, 4 pt, 6 pt, and 8 pt illustrated in FIG. 1) used in the evaluation of the covering property in Example 1 were used.

Next, the white ink was applied in the form of a solid image to cover all the four cyan character images by jetting the white ink from the IJ head on the downstream side in the transport direction of the base material without drying the four cyan character images. The white ink applied onto the base material was dried at 80° C. for 30 seconds, thereby obtaining a white solid image to cover all the four cyan character images.

The pretreatment liquid and each ink were respectively dried by placing the base material on a hot plate.

As described above, an image recorded material including the base material, the four cyan character images disposed on the base material, and the white solid image disposed on the entire region including the four cyan character images was obtained.

(2) Recording Conditions

The recording conditions including the specifications of the IJ head were set to be the same as the recording conditions in the image recording of Example 1.

<<Evaluation>>

<Image Definition>

The four character images were visually observed through the base material from the rear surface side (that is, the surface side where the image was not recorded) of the image recorded material, and the definition of the images was evaluated according to the following evaluation standards. The results are listed in Table 3.

In the evaluation standards, the rank of the most excellent definition of the image is "AA".

—Evaluation Standards for Image Definition—

AA: The details of the character images with sizes of 2 pt, 4 pt, 6 pt, and 8 pt were visually recognizable.

A: The details of the character image with a size of 2 pt were not visually recognizable, but the details of the character images with sizes of 4 pt, 6 pt, and 8 pt were visually recognizable.

B: The details of the character images with sizes of 2 pt and 4 pt were not visually recognizable, but the details of the character images with sizes of 6 pt and 8 pt were visually recognizable.

C: The details of the character images with sizes of 2 pt, 4 pt, and 6 pt were not visually recognizable, but the details of the character image with a size of 8 pt were visually recognizable.

D: The details of the character images with sizes of 2 pt, 4 pt, 6 pt, and 8 pt were not visually recognizable.

Example 111

The same operation as in Example 101 was performed except that the kind of the silicon compound in the colored ink was changed as listed in Table 3.

The results are listed in Table 3.

TABLE 3

|  |  |  | Example 101 | Example 102 | Example 103 | Example 104 | Example 105 | Example 106 |
|---|---|---|---|---|---|---|---|---|
| White ink | No. |  | W1 | W6 | W7 | W8 | W9 | W10 |
|  | Silicon compound | Type | SNOWTEX XS | Sodium silicate | Sodium silicate | Sodium silicate | Sodium silicate | Sodium silicate |
|  |  | Content (% by mass) (X1) | 0.05% | 0.0004% | 0.001% | 0.005% | 0.05% | 0.23% |
| Colored ink | Silicon compound | Type | SNOWTEX XS | SNOWTEX XS | SNOWTEX XS | SNOWTEX XS | SNOWTEX XS | SNOWTEX XS |
|  |  | Content (% by mass) (X2) | 0.05% | 0.05% | 0.05% | 0.05% | 0.05% | 0.05% |

TABLE 3-continued

| Ratio of X1/X2 | | | | 1.0 | 0.01 | 0.02 | 0.1 | 1.0 | 4.6 |
|---|---|---|---|---|---|---|---|---|---|
| Evaluation results | Image definition | | | B | AA | AA | A | B | B |

| | | | | Example 107 | Example 108 | Example 109 | Example 110 | Example 111 |
|---|---|---|---|---|---|---|---|---|
| White ink | No. | | | W11 | W12 | W13 | W14 | W8 |
| | Silicon compound | Type | | Potassium silicate | Lithium silicate | Ammonium silicate | Sodium silicate | Sodium silicate |
| | | Content (% by mass) (X1) | | 0.005% | 0.005% | 0.005% | 0.005% | 0.005% |
| Colored ink | Silicon compound | Type | | SNOWTEX XS | SNOWTEX XS | SNOWTEX XS | SNOWTEX XS | Sodium silicate |
| | | Content (% by mass) (X2) | | 0.05% | 0.05% | 0.05% | 0.05% | 0.05% |
| Ratio of X1/X2 | | | | 0.1 | 0.1 | 0.1 | 0.1 | 0.1 |
| Evaluation results | Image definition | | | A | A | A | A | B |

As listed in Table 3, more than a certain degree of image definition was obtained in all the examples.

In particular, as shown in the results of Examples 102 to 110, it was found that in a case where the silicon compound contained in the white ink is defined as the first silicon compound, the silicon compound contained in the colored ink is defined as the second silicon compound, and the content of the first silicon compound with respect to the total amount of the white ink is defined as X1% by mass and the content of the second silicon compound with respect to the total amount of the colored ink is defined as X2% by mass, the image definition is further excellent in a case where the ratio of X1/X2 is less than 1.0 (Examples 102 to 104 and 107 to 110).

Further, as shown in the results of Examples 104 and 111, it was found that in a case where the first silicon compound contained in the white ink contains a silicate and the second silicon compound contained in the colored ink contains colloidal silica (Example 104), the image definition is further excellent.

What is claimed is:

1. An ink set comprising:
a white ink which is an ink jet ink; and
a colored ink which contains water and a color pigment,
the white ink comprising:
    water;
    titanium dioxide particles; and
    a silicon compound,
    wherein an average primary particle diameter of the titanium dioxide particles is 100 nm or greater,
    the silicon compound is at least one selected from the group consisting of a silicate and colloidal silica,
    a content of the silicon compound is 0.0020% by mass or greater with respect to a total amount of the titanium dioxide particles,
    a ratio of a volume average particle diameter of the colloidal silica to the average primary particle diameter of the titanium dioxide particles is 0.04 or less,
wherein in a case where the silicon compound contained in the white ink is defined as a first silicon compound, the colored ink further contains a second silicon compound which is at least one selected from the group consisting of a silicate and colloidal silica, and
in a case where a content of the first silicon compound with respect to a total amount of the white ink is defined as X1% by mass and a content of the second silicon compound with respect to a total amount of the colored ink is defined as X2% by mass, a ratio of X1/X2 is less than 1.0.

2. The ink set according to claim 1,
wherein in a case where the silicon compound contained in the white ink is defined as a first silicon compound,
the colored ink further contains a second silicon compound which is at least one selected from the group consisting of a silicate and colloidal silica,
the first silicon compound contains a silicate, and
the second silicon compound contains colloidal silica.

3. The ink set according to claim 1, further comprising:
a pretreatment liquid which contains water and an aggregating agent.

4. An image recording method comprising:
a colored ink applying step of jetting the colored ink from an ink jet head and applying the colored ink onto an impermeable base material, using the ink set according to claim 1; and
a white ink applying step of jetting the white ink from the ink jet head and applying the white ink onto a region where the colored ink has been applied on the impermeable base material where the colored ink has been applied, using the ink set.

5. The image recording method according to claim 4, further comprising:
a pretreatment liquid applying step of applying a pretreatment liquid which contains water and an aggregating agent onto the impermeable base material before the colored ink applying step,
wherein the colored ink applying step is performed such that the colored ink is applied onto a region where the pretreatment liquid has been applied on the impermeable base material where the pretreatment liquid has been applied.

* * * * *